US012777492B2

(12) United States Patent
Thomas et al.

(10) Patent No.: US 12,777,492 B2
(45) Date of Patent: Oct. 27, 2026

(54) POSITIONING CONFIGURATION AND ASSISTANCE DATA ENHANCEMENTS OVER UNLICENSED BANDS

(71) Applicant: Lenovo (Singapore) Pte. Ltd., New Tech Park (SG)

(72) Inventors: Robin Thomas, Bad Nauheim (DE); Karthikeyan Ganesan, Kronberg im Taunus (DE); Ankit Bhamri, Rödermark (DE); Ali Ali, Kraiburg am Inn (DE); Alexander Golitschek Edler von Elbwart, Darmstadt (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 210 days.

(21) Appl. No.: 18/580,912

(22) PCT Filed: Jul. 19, 2022

(86) PCT No.: PCT/IB2022/056610
§ 371 (c)(1),
(2) Date: Jan. 19, 2024

(87) PCT Pub. No.: WO2023/002351
PCT Pub. Date: Jan. 26, 2023

(65) Prior Publication Data

US 2024/0373435 A1 Nov. 7, 2024

Related U.S. Application Data

(60) Provisional application No. 63/223,457, filed on Jul. 19, 2021.

(51) Int. Cl.
*H04W 72/23* (2023.01)
*G01S 5/02* (2010.01)
*H04W 4/029* (2018.01)

(52) U.S. Cl.
CPC ........... *H04W 72/23* (2023.01); *G01S 5/0236* (2013.01); *H04W 4/029* (2018.02)

(58) Field of Classification Search
None
See application file for complete search history.

(56) References Cited

U.S. PATENT DOCUMENTS

2018/0343056 A1 11/2018 Radulescu et al.
2020/0028583 A1 1/2020 Radulescu et al.
(Continued)

FOREIGN PATENT DOCUMENTS

WO 2015138178 A1 9/2015
WO 2020222519 A1 11/2020
(Continued)

OTHER PUBLICATIONS

PCT/IB2022/056610, "Notification of Transmittal of the International Search Report and the Written Opinion of the International Searching Authority, or the Declaration", International Searching Authority, Nov. 7, 2022, pp. 1-11.
(Continued)

*Primary Examiner* — Jamaal Henson
(74) *Attorney, Agent, or Firm* — Kunzler Needham Hilton

(57) ABSTRACT

Apparatuses, methods, and systems are disclosed for positioning configuration and assistance data enhancements over unlicensed bands. An apparatus (700) includes a transceiver (725) and a processor (705) coupled to the transceiver (725). The processor (705) is configured to cause the apparatus (700) to perform positioning procedures over an unlicensed band based on a configured channel access priority class ("CAPC") for positioning, the CAPC corresponding to different positioning service levels: receive a predetermined window size of a measurement window for positioning reference signal reception, a burst configuration, and a
(Continued)

listen-before-talk ("LBT") occasion within the window from the location server based on an available reception opportunity to be measured and processed over the unlicensed band; and perform positioning reference signal ("PRS") measurement based on the measurement window, the burst configuration, and the LBT occasion.

20 Claims, 10 Drawing Sheets

(56) References Cited

U.S. PATENT DOCUMENTS

| | | | | |
|---|---|---|---|---|
| 2021/0058889 | A1* | 2/2021 | Zhang | G01S 11/04 |
| 2021/0144735 | A1 | 5/2021 | Manolakos et al. | |
| 2022/0279581 | A1* | 9/2022 | Baek | G01S 13/765 |
| 2022/0353718 | A1* | 11/2022 | Duan | H04W 24/10 |

FOREIGN PATENT DOCUMENTS

| | | | | |
|---|---|---|---|---|
| WO | 2021041020 | A1 | 3/2021 | |
| WO | WO-2022233838 | A1 * | 11/2022 | G01S 5/0036 |

OTHER PUBLICATIONS

ETSI, "5 GHz RLAN; Harmonised Standard covering the essential requirements of article 3.2 of Directive 2014/53/EU", ETSI EN 301 893 V2.1.1, May 2017, pp. 1-122.

Qualcomm Inc., "Initial thoughts on Potential Positioning Enhancements", 3GPP TSG RAN WG1 #101-e R1-2004492, May 25-Jun. 5, 2020, pp. 1-14.

Qualcomm Inc., "Potential Enhancements for NR Rel-17 Positioning", 3GPP TSG RAN WG1 #102-e R1-2006810, Aug. 17-28, 2020, pp. 1-21.

3GPP, "3rd Generation Partnership Project; Technical Specification Group Radio Access Network; Study on NR-based access to unlicensed spectrum (Release 16)", 3GPP TR 38.889 V16.0.0, Dec. 2018, pp. 1-119.

3GPP, "3rd Generation Partnership Project; Technical Specification Group Services and System Aspects; Service requirements for cyber-physical control applications in vertical domains; Stage 1 (Release 18)", 3GPP TS 22.104 V18.1.0, Jun. 2021, pp. 1-81.

3GPP, "3rd Generation Partnership Project; Technical Specification Group Services and System Aspects; Service requirements for the 5G system; Stage 1 (Release 18)", 3GPP TS 22.261 V18.3.0, Jun. 2021, pp. 1-91.

3GPP, "3rd Generation Partnership Project; Technical Specification Group Radio Access Network; LTE Positioning Protocol (LPP) (Release 16)", 3GPP TS 37.355 V16.4.0, Mar. 2021, pp. 1-298.

3GPP, "3rd Generation Partnership Project; Technical Specification Group Radio Access Network; NR; Physical channels and modulation (Release 16)", 3GPP TS 38.211 V16.6.0, Jun. 2021, pp. 1-134.

3GPP, "3rd Generation Partnership Project; Technical Specification Group Radio Access Network; NR; Physical layer procedures for data (Release 16)", 3GPP TS 38.214 V16.6.0, Jun. 2021, pp. 1-172.

3GPP, "3rd Generation Partnership Project; Technical Specification Group Radio Access Network; NR; Physical layer measurements (Release 16)", 3GPP TS 38.215 V16.4.0, Dec. 2020, pp. 1-25.

3GPP, "3rd Generation Partnership Project; Technical Specification Group Radio Access Network; NG Radio Access Network (NG-RAN); Stage 2 functional specification of User Equipment (UE) positioning in NG-RAN (Release 16)", 3GPP TS 38.305 V16.4.0, Mar. 2021, pp. 1-119.

3GPP, "3rd Generation Partnership Project; Technical Specification Group Radio Access Network; NR; Radio Resource Control (RRC) protocol specification (Release 16)", 3GPP TS 38.331 V16.4.0, Mar. 2021, pp. 1-949.

* cited by examiner

300

402

```
-- ASN1START

NR-DL-TDOA-ProvideAssistanceData-r16 ::= SEQUENCE {
    nr-DL-PRS-AssistanceData-r16            NR-DL-PRS-AssistanceData-r16        OPTIONAL,      -- Need ON
    nr-SelectedDL-PRS-IndexList-r16         NR-SelectedDL-PRS-IndexList-r16     OPTIONAL,      -- Need ON
    nr-PositionCalculationAssistance-r16
                                            NR-PositionCalculationAssistance-r16
                                                                                OPTIONAL,      -- Cond UEB
    nr-DL-TDOA-Error-r16                    NR-DL-TDOA-Error-r16                OPTIONAL,      -- Need ON
    ...
}
-- ASN1STOP
```

FIG. 4A

404

```
-- ASN1START

NR-DL-TDOA-SignalMeasurementInformation-r16 ::= SEQUENCE {
    dl-PRS-ReferenceInfo-r16          DL-PRS-IdInfo-r16,
    nr-DL-TDOA-MeasList-r16               NR-DL-TDOA-MeasList-r16,
    ...
}

NR-DL-TDOA-MeasList-r16 ::= SEQUENCE (SIZE(1..nrMaxTRPs-r16)) OF NR-DL-TDOA-MeasElement-r16

NR-DL-TDOA-MeasElement-r16 ::= SEQUENCE {
    dl-PRS-ID-r16                     INTEGER (0..255),
    nr-PhysCellID-r16                 NR-PhysCellID-r16                        OPTIONAL,
    nr-CellGlobalID-r16               NCGI-r15                                 OPTIONAL,
    nr-ARFCN-r16                      ARFCN-ValueNR-r15                        OPTIONAL,
    nr-DL-PRS-ResourceId-r16          NR-DL-PRS-ResourceId-r16                 OPTIONAL,
    nr-DL-PRS-ResourceSetId-r16       NR-DL-PRS-ResourceSetId-r16              OPTIONAL,
    nr-TimeStamp-r16                  NR-TimeStamp-r16,
    nr-RSTD-r16                           CHOICE {
            k0-r16                            INTEGER (0..1970049),
            k1-r16                            INTEGER (0..985025),
            k2-r16                            INTEGER (0..492513),
            k3-r16                            INTEGER (0..246257),
            k4-r16                            INTEGER (0..123129),
            k5-r16                            INTEGER (0..61565),
            ...
    },
    nr-AdditionalPathList-r16         NR-AdditionalPathList-r16                OPTIONAL,
    nr-TimingQuality-r16              NR-TimingQuality-r16,
    nr-DL-PRS-RSRP-Result-r16         INTEGER (0..126)                         OPTIONAL,
    nr-DL-TDOA-AdditionalMeasurements-r16
                                      NR-DL-TDOA-AdditionalMeasurements-r16    OPTIONAL,
    ...
}

NR-DL-TDOA-AdditionalMeasurements-r16 ::= SEQUENCE (SIZE (1..3)) OF
                                                     NR-DL-TDOA-AdditionalMeasurementElement-r16


NR-DL-TDOA-AdditionalMeasurementElement-r16 ::= SEQUENCE {
    nr-DL-PRS-ResourceId-r16          NR-DL-PRS-ResourceId-r16                 OPTIONAL,
    nr-DL-PRS-ResourceSetId-r16       NR-DL-PRS-ResourceSetId-r16              OPTIONAL,
    nr-TimeStamp-r16                  NR-TimeStamp-r16,
    nr-RSTD-ResultDiff-r16            CHOICE {
            k0-r16                            INTEGER (0..8191),
            k1-r16                            INTEGER (0..4095),
            k2-r16                            INTEGER (0..2047),
            k3-r16                            INTEGER (0..1023),
            k4-r16                            INTEGER (0..511),
            k5-r16                            INTEGER (0..255),
            ...
    },
    nr-TimingQuality-r16              NR-TimingQuality-r16,
    nr-DL-PRS-RSRP-ResultDiff-r16     INTEGER (0..61)                          OPTIONAL,
    nr-AdditionalPathList-r16         NR-AdditionalPathList-r16                OPTIONAL,
    ...
}

-- ASN1STOP
```

FIG. 4B

POSITIONING CONFIGURATION AND ASSISTANCE DATA ENHANCEMENTS OVER UNLICENSED BANDS

CROSS-REFERENCE TO OTHER APPLICATIONS

This application claims the benefit of United States Provisional Patent Application No. 63/223,457, entitled "POSITIONING CONFIGURATION AND ASSISTANCE DATA ENHANCEMENTS OVER UNLICENSED BANDS" and filed on Jul. 19, 2021, for Robin Thomas et al., which is incorporated herein by reference.

FIELD

The subject matter disclosed herein relates generally to wireless communications and more particularly relates to positioning configuration and assistance data enhancements over unlicensed bands.

BACKGROUND

In wireless networks, specified solutions exist for supporting new radio ("NR") wireless communications in unlicensed bands (spectrum) also referred to as NR-U. Operating in the unlicensed band may provide flexibility in terms of aggregating or utilizing additional bandwidths, which may improve the overall positioning performance in terms of accuracy.

BRIEF SUMMARY

Disclosed are solutions for positioning configuration and assistance data enhancements over unlicensed bands. The solutions may be implemented by apparatus, systems, methods, or computer program products.

In one embodiment, a first apparatus includes a transceiver and a processor coupled to the transceiver. In one embodiment, the processor is configured to cause the apparatus to perform positioning procedures over an unlicensed band based on a configured channel access priority class ("CAPC") for positioning, the CAPC corresponding to different positioning service levels. In one embodiment, the processor is configured to cause the apparatus to receive a predetermined window size of a measurement window for positioning reference signal reception, a burst configuration, and a listen-before-talk ("LBT") occasion within the window from the location server based on an available reception opportunity to be measured and processed over the unlicensed band. In one embodiment, the processor is configured to cause the apparatus to perform positioning reference signal ("PRS") measurement based on the measurement window, the burst configuration, and the LBT occasion.

In one embodiment, a first method performs positioning procedures over an unlicensed band based on a CAPC for positioning, the CAPC corresponding to different positioning service levels. In one embodiment, first method receives a predetermined window size of a measurement window for positioning reference signal reception, a burst configuration, and a LBT occasion within the window from the location server based on an available reception opportunity to be measured and processed over the unlicensed band. In one embodiment, the first method performs PRS measurement based on the measurement window, the burst configuration, and the LBT occasion.

In one embodiment, a second apparatus includes a transceiver and a processor coupled to the transceiver. In one embodiment, the processor is configured to cause the apparatus to generate and transmit, to the UE, a downlink positioning reference signal ("DL-PRS") resource configuration. In one embodiment, the processor is configured to cause the apparatus to transmit, to the UE, a request to perform positioning measurements over an unlicensed band according to the DL-PRS resource configuration, the request comprising a configured CAPC for positioning, a predetermined window size of a measurement window for positioning reference signal reception, a burst configuration, and a LBT occasion within the window based on an available reception opportunity to be measured and processed over the unlicensed band, the CAPC corresponding to different positioning service levels.

In one embodiment, a second method generates and transmits, to the UE, a DL-PRS resource configuration. In one embodiment, the second method transmits, to the UE, a request to perform positioning measurements over an unlicensed band according to the DL-PRS resource configuration, the request comprising a configured CAPC for positioning, a predetermined window size of a measurement window for positioning reference signal reception, a burst configuration, and a LBT occasion within the window based on an available reception opportunity to be measured and processed over the unlicensed band, the CAPC corresponding to different positioning service levels.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 4A depicts one embodiment of downlink time difference of arrival ("DL-TDOA") Assistance Data;

FIG. 4B depicts one embodiment of DL-TDOA Measurement Report:

DETAILED DESCRIPTION

Figure 1:
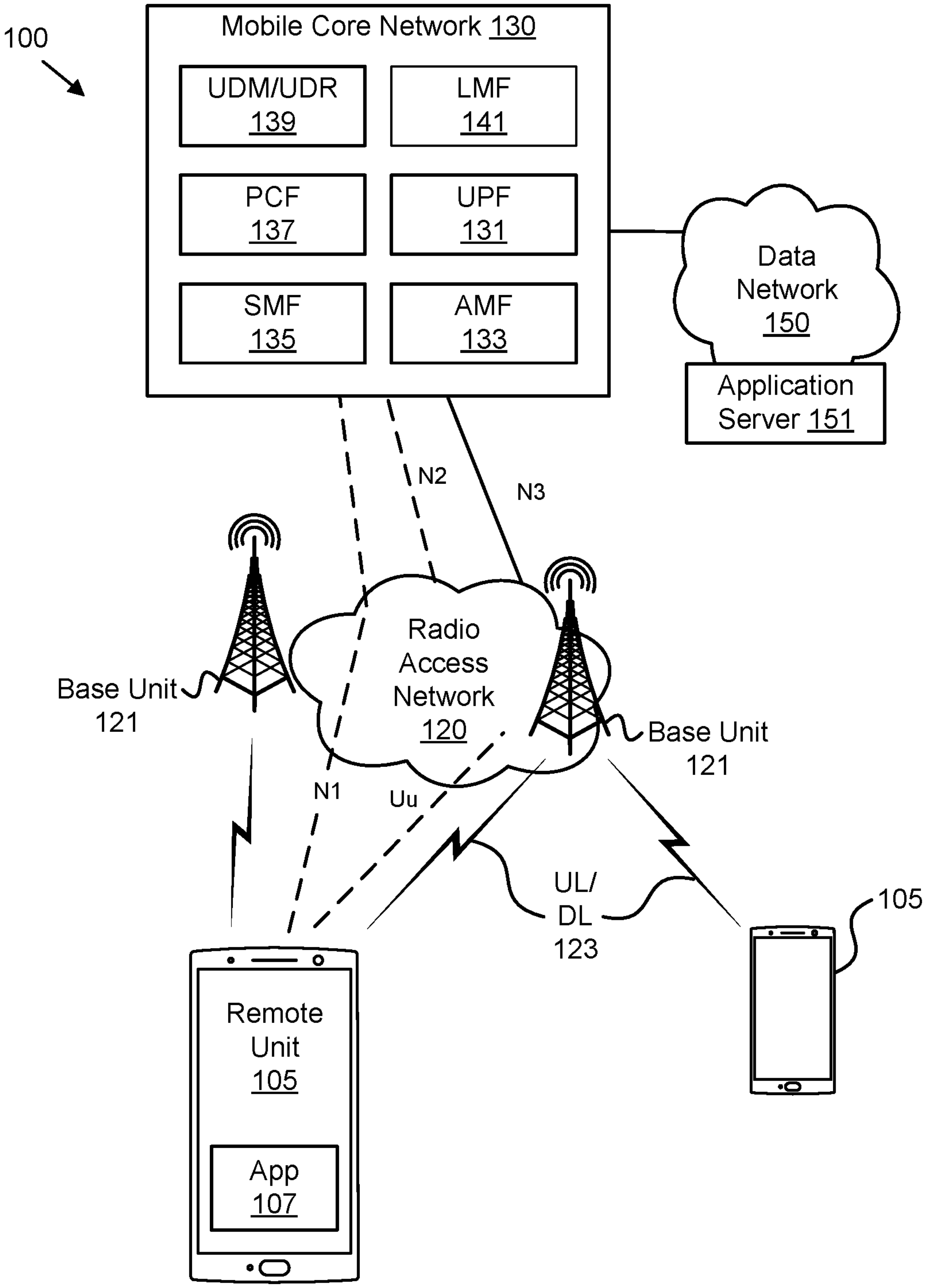
FIG. 1 is a schematic block diagram illustrating one embodiment of a wireless communication system for positioning configuration and assistance data enhancements over unlicensed bands.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including." "comprising," "having." and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatuses for positioning configuration and assistance data enhancements over unlicensed bands. In certain embodiments, the methods may be performed using computer code embedded on a computer-readable medium. In certain embodiments, an apparatus or system may include a computer-readable medium containing computer-readable code which, when executed by a processor, causes the apparatus or system to perform at least a portion of the below described solutions.

The present disclosure provides a set of enabling features to realize RAT-dependent positioning in unlicensed scenarios using the supported methods. Rel-16 has specified solutions supporting NR wireless communications in unlicensed bands (spectrum) also referred to as NR-U. Operating in the unlicensed band brings about flexibility in terms aggregating/utilizing additional bandwidths, which improves the overall positioning performance in terms of accuracy.

There are currently no existing specified solutions in the standard for enabling radio access technology ("RAT")-dependent positioning methods using unlicensed carriers. For instance, there is currently no signaling mechanism to enable a user equipment ("UE") to request for assistance data over an unlicensed carrier in a low latency manner for the purposes of UE-based positioning. An additional problem is to manage and coordinate the transmission of downlink positioning reference signals ("DL-PRS") over licensed and unlicensed bands in an aggregated fashion to maximize positioning accuracy of the target-UE.

A challenge in this operational scenario is to provide a positioning-related reference signal configuration and transmission (e.g., a DL-PRS) in the absence of a transmission opportunity and when such an opportunity is found, it should be transmitted within the defined channel occupancy time ("COT") by considering LBT procedures without drastically degrading the target-UE's location accuracy. The COT may represent a challenge for DL-TDOA and multi-round trip time ("RTT") procedures, which are timing-based positioning methods where the accuracy is drastically degraded if the measurements are not performed in a timely manner.

FIG. 1 depicts a wireless communication system 100 for positioning configuration and assistance data enhancements over unlicensed bands, according to embodiments of the disclosure. In one embodiment, the wireless communication system 100 includes at least one remote unit 105, a radio access network ("RAN") 120, and a mobile core network 130. The RAN 120 and the mobile core network 130 form a mobile communication network. The RAN 120 may be composed of a base unit 121 with which the remote unit 105 communicates using wireless communication links 115. Even though a specific number of remote units 105, base units 121, wireless communication links 115, RANs 120, and mobile core networks 130 are depicted in FIG. 1, one of skill in the art will recognize that any number of remote units 105, base units 121, wireless communication links 115, RANs 120, and mobile core networks 130 may be included in the wireless communication system 100.

In one implementation, the RAN 120 is compliant with the 5G system specified in the Third Generation Partnership Project ("3GPP") specifications. For example, the RAN 120 may be a New Generation Radio Access Network ("NG-RAN"), implementing NR RAT and/or 3GPP Long-Term Evolution ("LTE") RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

The remote units 105 may communicate directly with one or more of the base units 121 in the RAN 120 via uplink ("UL") and downlink ("DL") communication signals. Furthermore, the UL and DL communication signals may be carried over the wireless communication links 123. Here, the RAN 120 is an intermediate network that provides the remote units 105 with access to the mobile core network 130.

In some embodiments, the remote units 105 communicate with an application server via a network connection with the mobile core network 130. For example, an application 107 (e.g., web browser, media client, telephone and/or Voice-over-Internet-Protocol ("VOIP") application) in a remote unit 105 may trigger the remote unit 105 to establish a protocol data unit ("PDU") session (or other data connection) with the mobile core network 130 via the RAN 120. The mobile core network 130 then relays traffic between the remote unit 105 and the application server (e.g., the content server 151 in the packet data network 150) using the PDU session. The PDU session represents a logical connection between the remote unit 105 and the User Plane Function ("UPF") 131.

In order to establish the PDU session (or PDN connection), the remote unit 105 must be registered with the mobile core network 130 (also referred to as "attached to the mobile core network" in the context of a Fourth Generation ("4G") system). Note that the remote unit 105 may establish one or more PDU sessions (or other data connections) with the mobile core network 130. As such, the remote unit 105 may have at least one PDU session for communicating with the packet data network 150, e.g., representative of the Internet. The remote unit 105 may establish additional PDU sessions for communicating with other data networks and/or other communication peers.

In the context of a 5G system ("5GS"), the term "PDU Session" a data connection that provides end-to-end ("E2E") user plane ("UP") connectivity between the remote unit 105 and a specific Data Network ("DN") through the UPF 131. A PDU Session supports one or more Quality of Service ("QoS") Flows. In certain embodiments, there may be a one-to-one mapping between a QoS Flow and a QoS profile, such that all packets belonging to a specific QOS Flow have the same 5G QOS Identifier ("5Q1").

In the context of a 4G/LTE system, such as the Evolved Packet System ("EPS"), a Packet Data Network ("PDN") connection (also referred to as EPS session) provides E2E UP connectivity between the remote unit and a PDN. The PDN connectivity procedure establishes an EPS Bearer, i.e., a tunnel between the remote unit 105 and a Packet Gateway ("PGW", not shown) in the mobile core network 130. In certain embodiments, there is a one-to-one mapping between an EPS Bearer and a QoS profile, such that all packets belonging to a specific EPS Bearer have the same QoS Class Identifier ("QCI").

The base units 121 may be distributed over a geographic region. In certain embodiments, a base unit 121 may also be referred to as an access terminal, an access point, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a relay node, a RAN node, or by any other terminology used in the art. The base units 121 are generally part of a RAN, such as the RAN 120, that may include one or more controllers communicably coupled to one or more corresponding base units 121. These and other elements of radio access network are not illustrated but are well known generally by those having ordinary skill in the art. The base units 121 connect to the mobile core network 130 via the RAN 120.

The base units 121 may serve a number of remote units 105 within a serving area, for example, a cell or a cell sector, via a wireless communication link 123. The base units 121 may communicate directly with one or more of the remote units 105 via communication signals. Generally, the base units 121 transmit DL communication signals to serve the remote units 105 in the time, frequency, and/or spatial domain. Furthermore, the DL communication signals may be carried over the wireless communication links 123. The wireless communication links 123 may be any suitable carrier in licensed or unlicensed radio spectrum. The wireless communication links 123 facilitate communication between one or more of the remote units 105 and/or one or more of the base units 121. Note that during NR-U operation, the base unit 121 and the remote unit 105 communicate over unlicensed radio spectrum.

In one embodiment, the mobile core network 130 is a 5GC or an Evolved Packet Core ("EPC"), which may be coupled to a packet data network 150, like the Internet and private data networks, among other data networks. A remote unit 105 may have a subscription or other account with the mobile core network 130. Each mobile core network 130 belongs to a single public land mobile network ("PLMN"). The present disclosure is not intended to be limited to the implementation of any particular wireless communication system architecture or protocol.

The mobile core network 130 includes several network functions ("NFs"). As depicted, the mobile core network 130 includes at least one UPF 131. The mobile core network 130 also includes multiple control plane ("CP") functions including, but not limited to, an Access and Mobility Management Function ("AMF") 133 that serves the RAN 120, a Session Management Function ("SMF") 135, a Network Exposure Function ("NEF"), a Policy Control Function ("PCF") 137, a Location Management Function ("LMF") 141, a Unified Data Management function ("UDM") and a User Data Repository ("UDR") 139.

The UPF(s) 131 is responsible for packet routing and forwarding, packet inspection, QoS handling, and external PDU session for interconnecting Data Network ("DN"), in the 5G architecture. The AMF 133 is responsible for termination of NAS signaling, NAS ciphering & integrity protection, registration management, connection management, mobility management, access authentication and authorization, security context management. The SMF 135 is responsible for session management (i.e., session establishment, modification, release), remote unit (i.e., UE) IP address allocation & management, DL data notification, and traffic steering configuration for UPF for proper traffic routing.

The NEF is responsible for making network data and resources easily accessible to customers and network partners. Service providers may activate new capabilities and expose them through APIs. These APIs allow third-party authorized applications to monitor and configure the network's behavior for a number of different subscribers (i.e., connected devices with different applications). The PCF 137 is responsible for unified policy framework, providing policy rules to CP functions, access subscription information for policy decisions in UDR.

The LMF 141, in one embodiment, receives positioning measurements or estimates from RAN 120 and the remote unit 105 (e.g., via the AMF 133) and computes the position of the remote unit 105. The UDM 139 is responsible for generation of Authentication and Key Agreement ("AKA") credentials, user identification handling, access authorization, subscription management. The UDR is a repository of subscriber information and can be used to service a number of network functions. For example, the UDR may store subscription data, policy-related data, subscriber-related data that is permitted to be exposed to third party applications, and the like. In some embodiments, the UDM is co-located with the UDR, depicted as combined entity "UDM/UDR" 139.

In various embodiments, the mobile core network 130 may also include an Authentication Server Function ("AUSF") (which acts as an authentication server), a Network Repository Function ("NRF") (which provides NF service registration and discovery, enabling NFs to identify appropriate services in one another and communicate with each other over Application Programming Interfaces ("APIs")), or other NFs defined for the 5GC. In certain embodiments, the mobile core network 130 may include an authentication, authorization, and accounting ("AAA") server.

In various embodiments, the mobile core network 130 supports different types of mobile data connections and different types of network slices, wherein each mobile data connection utilizes a specific network slice. Here, a "network slice" refers to a portion of the mobile core network 130 optimized for a certain traffic type or communication service. A network instance may be identified by a single-network slice selection assistance information ("S-NSSAI,") while a set of network slices for which the remote unit 105 is authorized to use is identified by network slice selection assistance information ("NSSAI").

Here, "NSSAI" refers to a vector value including one or more S-NSSAI values. In certain embodiments, the various network slices may include separate instances of network functions, such as the SMF 135 and UPF 131. In some embodiments, the different network slices may share some common network functions, such as the AMF 133. The different network slices are not shown in FIG. 1 for ease of illustration, but their support is assumed. Where different network slices are deployed, the mobile core network 130 may include a Network Slice Selection Function ("NSSF") which is responsible for selecting of the Network Slice instances to serve the remote unit 105, determining the allowed NSSAI, determining the AMF set to be used to serve the remote unit 105.

Although specific numbers and types of network functions are depicted in FIG. 1, one of skill in the art will recognize that any number and type of network functions may be included in the mobile core network 130. Moreover, in an LTE variant where the mobile core network 130 comprises an EPC, the depicted network functions may be replaced with appropriate EPC entities, such as a Mobility Management Entity ("MME"), a Serving Gateway ("SGW"), a PGW, a Home Subscriber Server ("HSS"), and the like. For example, the AMF 133 may be mapped to an MME, the SMF 135 may be mapped to a control plane portion of a PGW and/or to an MME, the UPF 131 may be mapped to an SGW and a user plane portion of the PGW, the UDM/UDR 139 may be mapped to an HSS, etc.

While FIG. 1 depicts components of a 5G RAN and a 5G core network, the described embodiments apply to other types of communication networks and RATs, including IEEE 802.11 variants, Global System for Mobile Communications ("GSM", i.e., a 2G digital cellular network), General Packet Radio Service ("GPRS"), UMTS, LTE variants, CDMA 2000, Bluetooth, ZigBee, Sigfox, and the like.

In the following descriptions, the term "gNB" is used for the base station but it is replaceable by any other radio access node, e.g., RAN node, eNB, Base Station ("BS"), Access Point ("AP"), NR, etc. Further the operations are described mainly in the context of 5G NR. However, the proposed solutions/methods are also equally applicable to other mobile communication systems supporting CSI enhancements for higher frequencies.

Figure 2:
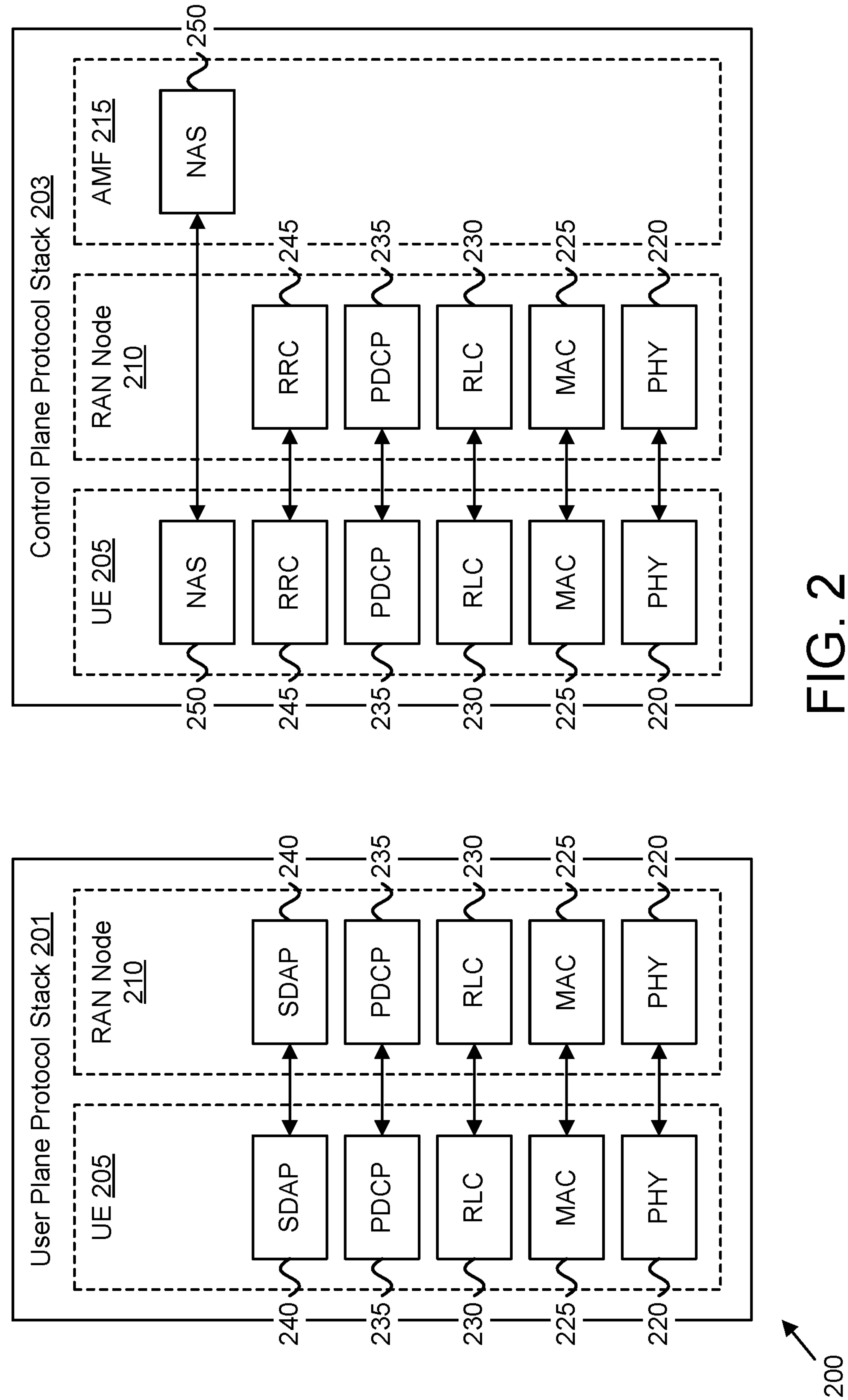
FIG. 2 is a block diagram illustrating one embodiment of a 5G NR protocol stack.

FIG. 2 depicts a NR protocol stack 200, according to embodiments of the disclosure. While FIG. 2 shows the UE 205, the RAN node 210 and an AMF 215 in a 5G core network ("5GC"), these are representative of a set of remote units 105 interacting with a base unit 121 and a mobile core network 140. As depicted, the protocol stack 200 comprises a User Plane protocol stack 201 and a Control Plane protocol stack 203. The User Plane protocol stack 201 includes a physical ("PHY") layer 220, a Medium Access Control ("MAC") sublayer 225, the Radio Link Control ("RLC") sublayer 230, a Packet Data Convergence Protocol ("PDCP") sublayer 235, and a Service Data Adaptation Protocol ("SDAP") sublayer 240. The Control Plane protocol stack 203 includes a physical layer 220, a MAC sublayer 225, a RLC sublayer 230, and a PDCP sublayer 235. The Control Plane protocol stack 203 also includes a Radio Resource Control ("RRC") sublayer 245 and a Non-Access Stratum ("NAS") sublayer 250.

The AS layer (also referred to as "AS protocol stack") for the User Plane protocol stack 201 consists of at least SDAP, PDCP, RLC and MAC sublayers, and the physical layer. The AS layer for the Control Plane protocol stack 203 consists of at least RRC, PDCP, RLC and MAC sublayers, and the physical layer. The Layer-2 ("L2") is split into the SDAP, PDCP, RLC and MAC sublayers. The Layer-3 ("L3") includes the RRC sublayer 245 and the NAS layer 250 for the control plane and includes, e.g., an Internet Protocol ("IP") layer and/or PDU Layer (not depicted) for the user plane. L1 and L2 are referred to as "lower layers," while L3 and above (e.g., transport layer, application layer) are referred to as "higher layers" or "upper layers."

The physical layer 220 offers transport channels to the MAC sublayer 225. The physical layer 220 may perform a Clear Channel Assessment and/or Listen-Before-Talk ("CCA/LBT") procedure using energy detection thresholds, as described herein. In certain embodiments, the physical layer 220 may send a notification of UL Listen-Before-Talk ("LBT") failure to a MAC entity at the MAC sublayer 225. The MAC sublayer 225 offers logical channels to the RLC sublayer 230. The RLC sublayer 230 offers RLC channels to the PDCP sublayer 235. The PDCP sublayer 235 offers radio bearers to the SDAP sublayer 240 and/or RRC layer 245. The SDAP sublayer 240 offers QoS flows to the core network (e.g., 5GC). The RRC layer 245 provides for the addition, modification, and release of Carrier Aggregation and/or Dual Connectivity. The RRC layer 245 also manages the establishment, configuration, maintenance, and release of Signaling Radio Bearers ("SRBs") and Data Radio Bearers ("DRBs").

The NAS layer 250 is between the UE 205 and the 5GC 215. NAS messages are passed transparently through the RAN. The NAS layer 250 is used to manage the establishment of communication sessions and for maintaining continuous communications with the UE 205 as it moves between different cells of the RAN. In contrast, the AS layer is between the UE 205 and the RAN (e.g., RAN node 210) and carries information over the wireless portion of the network.

As background, for Release 17 ("Rel-17") of the 3GPP specification, the different positioning requirements are especially stringent with respect to accuracy, latency, and reliability. Table 1 shows positioning performance requirements for different scenarios in an Industrial IoT ("IIoT") or indoor factory setting.

TABLE 1

IIoT Positioning Performance Requirements

| Scenario | Horizontal accuracy | Vertical accuracy | Availability | Heading | Latency for position estimation of UE | UE Speed | Corresponding Positioning Service Level in TS 22.261 |
|---|---|---|---|---|---|---|---|
| Mobile control panels with safety functions (non-danger zones) | <5 m | <3 m | 90% | N/A | <5 s | N/A | Service Level 2 |
| Process automation - plant asset management | <1 m | <3 m | 90% | N/A | <2 s | <30 km/h | Service Level 3 |
| Flexible, modular assembly area in smart factories (for tracking of tools at the work-place location) | <1 m (relative positioning) | N/A | 99% | N/A | 1 s | <30 km/h | Service Level 3 |
| Augmented reality in smart factories | <1 m | <3 m | 99% | <0.17 rad | <15 ms | <10 km/h | Service Level 4 |
| Mobile control panels with safety functions in smart factories (within factory danger zones) | <1 m | <3 m | 99.9% | <0.54 rad | <1 s | N/A | Service Level 4 |
| Flexible, modular assembly area in smart factories (for autonomous vehicles, only for monitoring proposes) | <50 cm | <3 m | 99% | N/A | 1 s | <30 km/h | Service Level 5 |
| Inbound logistics for manufacturing (for driving trajectories (if supported by further sensors like camera, GNSS, IMU) of indoor autonomous driving systems)) | <30 cm (if supported by further sensors like camera, GNSS, IMU) | <3 m | 99.9% | N/A | 10 ms | <30 km/h | Service Level 6 |

TABLE 1-continued

IIoT Positioning Performance Requirements

| Scenario | Horizontal accuracy | Vertical accuracy | Availability | Heading | Latency for position estimation of UE | UE Speed | Corresponding Positioning Service Level in TS 22.261 |
|---|---|---|---|---|---|---|---|
| Inbound logistics for manufacturing (for storage of goods) | <20 cm | <20 cm | 99% | N/A | <1 s | <30 km/h | Service Level 7 |

Some UE positioning techniques supported in Rel-16 are listed in Table 2. The separate positioning techniques as indicated in Table 2 may be currently configured and performed based on the requirements of the location management function ("LMF") and/or UE capabilities. Note that Table 2 includes TBS positioning based on PRS signals, but only observed time difference of arrival ("OTDOA") based on LTE signals is supported. The E-CID includes Cell-ID for NR method. The Terrestrial Beacon System ("TBS") method refers to TBS positioning based on Metropolitan Beacon System ("MBS") signals.

TABLE 1

Supported Rel-16 UE positioning methods

| Method | UE-based | UE-assisted, LMF-based | NG-RAN node assisted | Secure User Plane Location ("SUPL") |
|---|---|---|---|---|
| A-GNSS | Yes | Yes | No | Yes (UE-based and UE-assisted) |
| OTDOA | No | Yes | No | Yes (UE-assisted) |
| E-CID | No | Yes | Yes | Yes for E-UTRA (UE-assisted) |
| Sensor | Yes | Yes | No | No |
| WLAN | Yes | Yes | No | Yes |
| Bluetooth | No | Yes | No | No |
| TBS | Yes | Yes | No | Yes (MBS) |
| DL-TDOA | Yes | Yes | No | No |
| DL-AoD | Yes | Yes | No | No |
| Multi-RTT | No | Yes | Yes | No |
| NR E-CID | No | Yes | FFS | No |
| UL-TDOA | No | No | Yes | No |
| UL-AoA | No | No | Yes | No |

The transmission of PRS enable the UE to perform UE positioning-related measurements to enable the computation of a UE's location estimate and are configured per Transmission Reception Point ("TRP"), where a TRP may transmit one or more beams.

In one embodiment, the following RAT-dependent positioning techniques may be supported by the system 100:

DL-TDoA: The downlink time difference of arrival ("DL-TDOA") positioning method makes use of the DL RS Time Difference ("RSTD") (and optionally DL PRS RS Received Power ("RSRP") of DL PRS RS Received Quality ("RSRQ")) of downlink signals received from multiple TPs, at the UE (e.g., remote unit 105). The UE measures the DL RSTD (and optionally DL PRS RSRP) of the received signals using assistance data received from the positioning server, and the resulting measurements are used along with other configuration information to locate the UE in relation to the neighboring Transmission Points ("TPs").

DL-AoD: The DL Angle of Departure ("AoD") positioning method makes use of the measured DL PRS RSRP of downlink signals received from multiple TPs, at the UE. The UE measures the DL PRS RSRP of the received signals using assistance data received from the positioning server, and the resulting measurements are used along with other configuration information to locate the UE in relation to the neighboring TPs.

Multi-RTT: The Multiple-Round Trip Time ("Multi-RTT") positioning method makes use of the UE Receive-Transmit ("Rx-Tx") measurements and DL PRS RSRP of downlink signals received from multiple TRPs, measured by the UE and the gNB Rx-Tx measurements (e.g., measured by RAN node) and UL SRS-RSRP at multiple TRPs of uplink signals transmitted from UE.

The UE measures the UE Rx-Tx measurements (and optionally DL PRS RSRP of the received signals) using assistance data received from the positioning server, and the TRPs measure the gNB Rx-Tx measurements (and optionally UL SRS-RSRP of the received signals) using assistance data received from the positioning server. The measurements are used to determine the Round Trip Time ("RTT") at the positioning server which are used to estimate the location of the UE. In one embodiment, Multi-RTT is only supported for UE-assisted/NG-RAN assisted positioning techniques, as noted in Table 2.

E-CID/NR E-CID: Enhanced Cell ID ("CID") positioning method, the position of a UE is estimated with the knowledge of its serving ng-eNB, gNB and cell and is based on LTE signals. The information about the serving ng-eNB, gNB and cell may be obtained by paging, registration, or other methods. NR Enhanced Cell ID ("NR E-CID") positioning refers to techniques which use additional UE measurements and/or NR radio resource and other measurements to improve the UE location estimate using NR signals.

Although NR E-CID positioning may utilize some of the same measurements as the measurement control system in the RRC protocol, the UE generally is not expected to make additional measurements for the sole purpose of positioning: e.g., the positioning procedures do not supply a measurement configuration or measurement control message, and the UE reports the measurements that it has available rather than being required to take additional measurement actions.

UL-TDoA: The UL TDOA positioning method makes use of the UL TDOA (and optionally UL SRS-RSRP) at multiple reception points ("RPs") of uplink signals transmitted from the UE. The RPs measure the UL TDOA (and optionally UL SRS-RSRP) of the received signals using assistance data received from the positioning server, and the resulting measurements are used along with other configuration information to estimate the location of the UE.

UL-AoA: The UL Angle of Arrival ("AoA") positioning method makes use of the measured azimuth and the zenith angles of arrival at multiple RPs of uplink signals transmitted from the UE. The RPs measure A-AoA and Z-AoA of the received signals using assistance data received from the positioning server, and the resulting measurements are used along with other configuration information to estimate the location of the UE.

Figure 3:
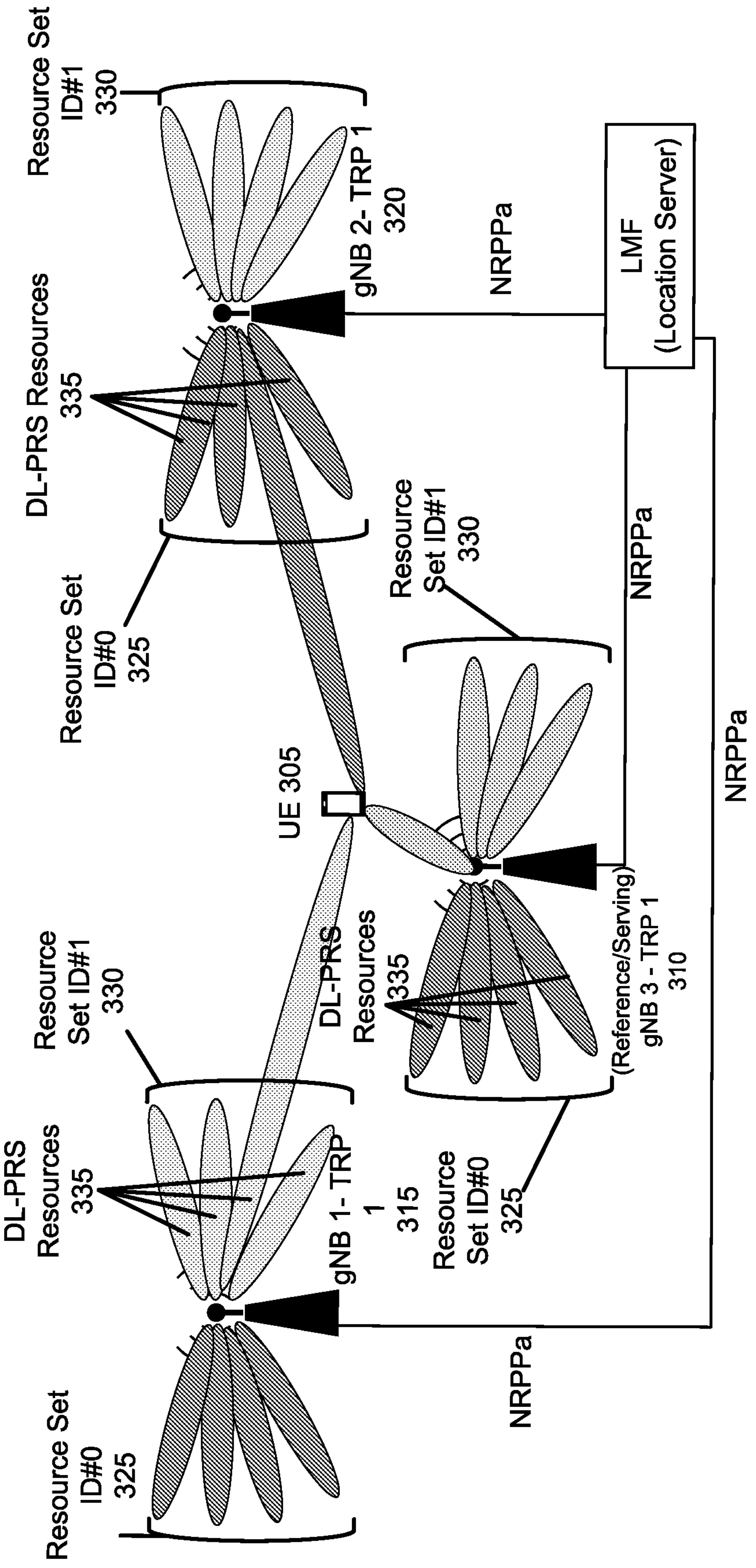
FIG. 3 depicts one embodiment of NR Beam-based Positioning.

FIG. 3 depicts a system 300 for NR beam-based positioning. According to Rel-16, the PRS can be transmitted by different base stations (serving and neighboring) using narrow beams over Frequency Range #1 Between ("FR1", e.g., frequencies from 410 MHz to 7125 MHz) and Frequency Range #2 ("FR2", e.g., frequencies from 24.25 GHz to 52.6 GHz), which is relatively different when compared to LTE where the PRS was transmitted across the whole cell.

As illustrated in FIG. 3, a UE 305 may receive PRS from a first gNB ("gNB 3") 310, which is a serving gNB, and also from a neighboring second gNB ("gNB 1") 315, and a neighboring third gNB ("gNB 2") 320. Here, the PRS can be locally associated with a set of PRS Resources grouped under a Resource Set ID for a base station (e.g., TRP). In the depicted 20) embodiments, each gNB 310, 315, 320 is configured with a first Resource Set ID 325 and a second Resource Set ID 330. As depicted, the UE 305 receives PRS on transmission beams: here, receiving PRS from the gNB 3 310 on a set of PRS Resources 335 from the second Resource Set ID 330, receiving PRS from the gNB 1 315 on a set of PRS Resources 335 from the second Resource Set ID 330, and receiving PRS from the gNB 2 320 on a set of PRS Resources 335 from the first Resource Set ID 325.

Similarly, UE positioning measurements such as Reference Signal Time Difference ("RSTD") and PRS RSRP measurements are made between beams as opposed to different cells as was the case in LTE. In addition, there are additional UL positioning methods for the network to exploit in order to compute the target UE's location. Table 3 and Table 4 show the reference signal to measurements mapping required for each of the supported RAT-dependent positioning techniques at the UE and gNB, respectively. RAT-dependent positioning techniques involve the 3GPP RAT and core network entities to perform the position estimation of the UE, which are differentiated from RAT-independent positioning techniques which rely on GNSS, IMU sensor, WLAN and Bluetooth technologies for performing target device (e.g., UE) positioning.

TABLE 3

UE Measurements to enable RAT-dependent positioning techniques

| DL/UL Reference Signals | UE Measurements | To facilitate support of the following positioning techniques |
|---|---|---|
| Rel.16 DL PRS | DL RSTD | DL-TDOA |
| Rel.16 DL PRS | DL PRS RSRP | DL-TDOA, DL-AoD, Multi-RTT |
| Rel. 16 DL PRS/ Rel. 16 SRS for positioning | UE Rx − Tx time difference | Multi-RTT |
| Rel. 15 SSB/CSI-RS for RRM | SS-RSRP(RSRP for RRM), SS-RSRQ(for RRM), CSI-RSRP (for RRM), CSI-RSRQ (for RRM), SS-RSRPB (for RRM) | E-CID |

TABLE 4 gNB Measurements to enable RAT-dependent positioning techniques

| DL/UL Reference Signals | gNB Measurements | To facilitate support of the following positioning techniques |
|---|---|---|
| Rel.16 SRS for positioning | UL RTOA | UL-TDOA |
| Rel.16 SRS for positioning | UL SRS-RSRP | UL-TDOA, UL-AoA, Multi-RTT |
| Rel.16 SRS for positioning, Rel.16 DL PRS | gNB Rx − Tx time difference | Multi-RTT |
| Rel.16 SRS for positioning, | AoA and ZoA | UL-AoA, Multi-RTT |

Regarding PRS Reception Procedure, in one embodiment, the UE can be configured with one or more DL PRS resource set configuration(s) as indicated by the higher layer parameters NR-DL-PRS-ResourceSet and NR-DL-PRS-Resource, e.g., as defined by Clause 6.4.3 of TS 37.355. Each DL PRS resource set consists of K≥1 DL PRS resource(s) where each has an associated spatial transmission filter. The UE can be configured with one or more DL PRS positioning frequency layer configuration(s) as indicated by the higher layer parameter NR-DL-PRS-PositioningFrequencyLayer. A DL PRS positioning frequency layer is defined as a collection of DL PRS resource sets which have common parameters configured by NR-DL-PRS-PositioningFrequencyLayer.

In one embodiment, the UE assumes that the following parameters for each DL PRS resource(s) are configured via higher layer parameters NR-DL-PRS-PositioningFrequencyLayer, NR-DL-PRS-ResourceSet and NR-DL-PRS-Resource.

A positioning frequency layer that is configured by NR-DL-PRS-PositioningFrequencyLayer, consists of one or more DL PRS resource sets and it is defined by:

- dl-PRS-SubcarrierSpacing defines the subcarrier spacing for the DL PRS resource. All DL PRS resources and DL PRS resource sets in the same DL PRS positioning frequency layer have the same value of dl-PRS-SubcarrierSpacing. The supported values of dl-PRS-SubcarrierSpacing are given in Table 4.2-1 of TS38.211.
- dl-PRS-CyclicPrefix defines the cyclic prefix for the DL PRS resource. All DL PRS Resources and DL PRS Resource sets in the same DL PRS positioning frequency layer have the same value of dl-PRS-CyclicPrefix. The supported values of dl-PRS-CyclicPrefix are given in Table 4.2-1 of TS38.211.
- dl-PRS-PointA defines the absolute frequency of the reference resource block. Its lowest subcarrier is also known as Point A. All DL PRS resources belonging to the same DL PRS resource set have common Point A and all DL PRS resources sets belonging to the same DL PRS positioning frequency layer have a common Point A.

The UE expects that it will be configured with dl-PRS-ID each of which is defined such that it is associated with multiple DL PRS resource sets. The UE expects that one of these dl-PRS-ID along with a nr-DL-PRS-ResourceSetID and a nr-DL-PRS-ResourceID-r16 can be used to uniquely identify a DL PRS resource.

A DL PRS resource set is configured by NR-DL-PRS-ResourceSet, consists of one or more DL PRS resources and it is defined by:

- nr-DL-PRS-ResourceSetID defines the identity of the DL PRS resource set configuration.
- dl-PRS-Periodicity-and-ResourceSetSlotOffset defines the DL PRS resource periodicity and takes values $$T_{per}^{PRS} \in 2^{\mu}\{4, 5, 8, 10, 16, 20, 32, 40, 64, 80, 160, 320, 640, 1280, 2560, 5120, 10240\}$$

slots, where μ=0, 1, 2, 3 for dl-PRS-SubcarrierSpacing=15, 30, 60 and 120 kHz respectively and the slot offset for DL PRS resource set with respect to SFN0 slot 0. All the DL PRS resources within one DL PRS resource set are configured with the same DL PRS resource periodicity.

dl-PRS-ResourceRepetitionFactor defines how many times each DL-PRS resource is repeated for a single instance of the DL-PRS resource set and takes values $$T_{rep}^{PRS} \in \{1, 2, 4, 6, 8, 16, 32\}.$$

All the DL PRS resources within one resource set have the same resource repetition factor.

dl-PRS-ResourceTimeGap defines the offset in number of slots between two repeated instances of a DL PRS resource with the same nr-DL-PRS-ResourceSetId within a single instance of the DL PRS resource set. The UE only expects to be configured with dl-PRS-ResourceTimeGap if dl-PRS-ResourceRepetitionFactor is configured with value greater than 1. The time duration spanned by one instance of a nr-DL-PRS-ResourceSet is not expected to exceed the configured value of DL PRS periodicity. All the DL PRS resources within one resource set have the same value of dl-PRS-ResourceTimeGap.

dl-PRS-MutingOption1 and dl-PRS-MutingOption2 define the time locations where the DL PRS resource is expected to not be transmitted for a DL PRS resource set. If dl-PRS-MutingOption1 is configured, each bit in the bitmap of dl-PRS-MutingOption1 corresponds to a configurable number provided by higher layer parameter dl-prs-MutingBitRepetitionFactor of consecutive instances of a DL PRS resource set where all the DL PRS resources within the set are muted for the instance that is indicated to be muted. The length of the bitmap can be {2, 4, 6, 8, 16, 32} bits. If dl-PRS-MutingOption2 is configured each bit in the bitmap of dl-PRS-MutingOption2 corresponds to a single repetition index for each of the DL PRS resources within each instance of a nr-DL-PRS-ResourceSet and the length of the bitmap is equal to the values of dl-PRS-ResourceRepetitionFactor. Both dl-PRS-MutingOption1 and dl-PRS-MutingOption2 may be configured at the same time in which case the logical AND operation is applied to the bit maps as described in Clause 7.4.1.7.4 of TS 38.211.

NR-DL-PRS-SFN0-Offset defines the time offset of the SFN0 slot 0 for the transmitting cell with respect to SFN0 slot 0 of reference cell.

dl-PRS-ResourceList determines the DL PRS resources that are contained within one DL PRS resource set.

dl-PRS-CombSizeN defines the comb size of a DL PRS resource where the allowable values are given in Clause 7.4.1.7.3 of TS38.211. All DL PRS resource sets belonging to the same positioning frequency layer have the same value of dl-PRS-CombSizeN.

dl-PRS-ResourceBandwidth defines the number of resource blocks configured for DL PRS transmission. The parameter has a granularity of 4 physical resource blocks ("PRBs") with a minimum of 24 PRBs and a maximum of 272 PRBs. All DL PRS resources sets within a positioning frequency layer have the same value of dl-PRS-ResourceBandwidth.

dl-PRS-StartPRB defines the starting PRB index of the DL PRS resource with respect to reference Point A, where reference Point A is given by the higher-layer parameter dl-PRS-PointA. The starting PRB index has a granularity of one PRB with a minimum value of 0 and a maximum value of 2176 PRBs. All DL PRS resource sets belonging to the same positioning frequency layer have the same value of dl-PRS-StartPRB.

dl-PRS-NumSymbols defines the number of symbols of the DL PRS resource within a slot where the allowable values are given in Clause 7.4.1.7.3 of TS38.211.

In one embodiment, a DL PRS resource is defined by:

nr-DL-PRS-ResourceID determines the DL PRS resource configuration identity.

All DL PRS resource IDs are locally defined within a DL PRS resource set.

dl-PRS-SequenceID is used to initialize $c_{init}$ value used in pseudo random generator as described in Clause 7.4.1.7.2 of TS 38.211 for generation of DL PRS sequence for a given DL PRS resource.

dl-PRS-CombSizeN-AndReOffset defines the starting resource element ("RE") offset of the first symbol within a DL PRS resource in frequency. The relative RE offsets of the remaining symbols within a DL PRS resource are defined based on the initial offset and the rule described in Clause 7.4.1.7.3 of TS 38.211.

dl-PRS-ResourceSlotOffset determines the starting slot of the DL PRS resource with respect to corresponding DL PRS resource set slot offset.

dl-PRS-ResourceSymbolOffset determines the starting symbol of a slot configured with the DL PRS resource.

dl-PRS-QCL-Info defines any quasi co-location information of the DL PRS resource with other reference signals. The DL PRS may be configured with QCL 'typeD' with a DL PRS from a serving cell or a non-serving cell, or with rs-Type set to 'typeC', 'typeD', or 'typeC-plus-typeD' with a synchronization signal ("SS")/physical broadcast channel ("PBCH") Block from a serving or non-serving cell.

In one embodiment, the UE assumes constant energy per resource element ("EPRE") is used for all REs of a given DL PRS resource.

The UE may be indicated by the network that DL PRS resource(s) can be used as the reference for the DL RSTD, DL PRS-RSRP, and UE Rx-Tx time difference measurements in a higher layer parameter nr-DL-PRS-ReferenceInfo. The reference indicated by the network to the UE can also be used by the UE to determine how to apply higher layer parameters nr-DL-PRS-ExpectedRSTD and nr-DL-PRS-ExpectedRSTD-Unceraínty. The UE expects the reference to be indicated whenever it is expected to receive the DL PRS. This reference provided by nr-DL-PRS-ReferenceInfo may include a dl-PRS-ID, a DL PRS resource set ID, and optionally a single DL PRS resource ID or a list of DL PRS resource IDs, e.g., as in TS 37.355. The UE may use different DL PRS resources or a different DL PRS resource set to determine the reference for the RSTD measurement as long as the condition that the DL PRS resources used belong to a single DL PRS resource set is met. If the UE chooses to use a different reference than indicated by the network, then it is expected to report the dl-PRS-ID, the DL PRS resource ID(s) or the DL PRS resource set ID used to determine the reference.

The UE may be configured to report quality metrics NR-TimingQuality corresponding to the DL RSTD and UE Rx-Tx time difference measurements which include the following fields:

timingQualityValue which provides the best estimate of the uncertainty of the measurement timingQualityResolution which specifies the resolution levels used in the timingQualityValue field.

The UE expects to be configured with higher layer parameter nr-DL-PRS-ExpectedRSTD, which defines the time difference with respect to the received DL subframe timing the UE is expected to receive DL PRS, and nr-DL-PRS-ExpectedRSTD-Uncertainty, which defines a search window around the nr-DL-PRS-ExpectedRSTD.

For DL UE positioning measurement reporting in higher layer parameters NR-DL-TDOA-SignalMeasurementInformation or NR-Multi-RTT-SignalMeasurementInformation the UE can be configured to report the DL PRS resource ID(s) or the DL PRS resource set ID(s) associated with the DL PRS resource(s) or the DL PRS resource set(s) which are used in determining the UE measurements DL RSTD, UE Rx-Tx time difference.

For the DL RSTD, DL PRS-RSRP, and UE Rx-Tx time difference measurements the UE can report an associated higher layer parameter nr-TimeStamp. The nr-TimeStamp can include the dl-PRS-ID, the system frame number ("SFN") and the slot number for a subcarrier spacing. These values correspond to the reference which is provided by nr-DL-PRS-Reference Info.

The UE is expected to measure the DL PRS resource outside the active DL bandwidth part ("BWP") or with a numerology different from the numerology of the active DL BWP if the measurement is made during a configured measurement gap. When the UE is expected to measure the DL PRS resource outside the active DL BWP it may request a measurement gap via higher layer parameter NR-PRS-MeasurementInfoList, e.g., as in TS 38.331.

The UE assumes that the DL PRS from the serving cell is not mapped to any symbol that contains SS/PBCH block from the serving cell. If the time frequency location of the SS/PBCH block transmissions from non-serving cells are provided to the UE then the UE also assumes that the DL PRS from a non-serving cell is not mapped to any symbol that contains the SS/PBCH block of the same non-serving cell.

The UE may be configured to measure and report, subject to UE capability, up to 4 DL RSTD measurements per pair of dl-PRS-ID with each measurement between a different pair of DL PRS resources or DL PRS resource sets within the DL PRS configured for those dl-PRS-ID. The up to 4 measurements being performed on the same pair of dl-PRS-ID and all DL RSTD measurements in the same report use a single reference timing.

The UE may be configured to measure and report, subject to UE capability, up to 8 DL PRS-RSRP measurements on different DL PRS resources associated with the same dl-PRS-ID. When the UE reports DL PRS-RSRP measurements from one DL PRS resource set, the UE may indicate which DL PRS-RSRP measurements associated with the same higher layer parameter nr-DL-PRS-RxBeamIndex, e.g., as in TS 37.355, have been performed using the same spatial domain filter for reception if for each nr-DL-PRS-RxBeamIndex reported there are at least 2 DL PRS-RSRP measurements associated with it within the DL PRS resource set.

The UE may be configured to measure and report, subject to UE capability, up to 4 UE Rx-Tx time difference measurements corresponding to a single configured SRS resource or resource set for positioning. Each measurement corresponds to a single received DL PRS resource or resource set which can be in different positioning frequency layers.

The UE may be configured to measure and report, subject to UE capability, the timing, and the quality metrics of up to 2 additional detected paths that are associated with each RSTD or UE Rx-Tx time difference. The timing of each additional path is reported relative to the path timing used for determining nr-RSTD or nr-UE-RxTxTimeDiff.

If the UE is configured with DL-PRS-QCL-Info and the QCL relation is between two DL PRS resources, then the UE assumes those DL PRS resources are associated with the same dl-PRS-ID. If DL-PRS-QCL-Info is configured to the UE with qcl-Type set to 'type-D' with a source DL-PRS-Resource then the nr-DL-PRS-ResourceSetId and the nr-DL-PRS-ResourceId of the source DL PRS resource are expected to be indicated to the UE. Embodiments may be practiced in other specific forms.

UE is not expected to process DL PRS without configuration of measurement gap.

Within a positioning frequency layer, the DL PRS resources are sorted in the decreasing order of priority for measurement to be performed by the UE, with the reference indicated by nr-DL-PRS-ReferenceInfo being the highest priority for measurement, and the following priority is assumed:

Up to 64 dl-PRS-IDs of the frequency layer are sorted according to priority:

Up to 2 DL PRS resource sets per dl-PRS-ID of the frequency layer are sorted according to priority.

For the case when measurement gap is configured, the UE DL PRS processing capability is defined in TS 37.355. For the purpose of DL PRS processing capability, the duration K msec of DL PRS symbols within P msec window corresponding to the maximum PRS periodicity in a positioning frequency layer, is calculated by:

Type 1 duration calculation with UE symbol level buffering capability $$K = \sum_{s \in S} K_s$$

$$K_s = T_s^{end} - T_s^{start}$$

Type 2 duration calculation with UE slot level buffering capability $$K = \frac{1}{2^{\mu}} |S|$$

S is the set of slots based on the numerology of the DL PRS of a serving cell within the P msec window in the positioning frequency layer that contains potential DL PRS resources considering the actual nr-DL-PRS-ExpectedRSTD, nr-DL-PRS-ExpectedRSTD-Uncertainty provided for each pair of DL PRS Resource Sets.

For Type 1, $$[T_s^{start}, T_s^{end}]$$

is the smallest interval in msec within slot s corresponding to an integer number of OFDM symbols based on the numerology of the DL PRS of a serving cell that covers the union of the potential PRS symbols and determines the PRS symbol occupancy within slot s, where the interval $$[T_s^{start}, T_s^{end}]$$

considers the actual nr-DL-PRS-ExpectedRSTD, nr-DL-PRS-ExpectedRSTD-Uncertainty provided for each pair of DL PRS resource sets (target and reference).

For Type 2, μ is the numerology of the DL PRS, and |S| is the cardinality of the set S.

Regarding Measurement and Report Configuration, according to TS38.215, UE measurements have been defined, which are applicable to DL-based positioning techniques, see subclause 2.4. For a conceptual overview of the current implementation in Rel-16, the assistance data configurations (see FIG. 4A) and measurement information (see FIG. 4B) are provided for each of the supported positioning techniques:

The information element ("IE") NR-DL-TDOA-Provide AssistanceData 402, shown in FIG. 4A, is used by the location server to provide assistance data to enable UE-assisted and UE-based NR downlink TDOA. It may also be used to provide NR DL TDOA positioning specific error reason.

The IE NR-DL-TDOA-SignalMeasurementInformation 404, shown in FIG. 4B, is used by the target device to provide NR-DL TDOA measurements to the location server. The measurements are provided as a list of TRPs, where the first TRP in the list is used as reference TRP in case RSTD measurements are reported. The first TRP in the list may or may not be the reference TRP indicated in the NR-DL-PRS-AssistanceData. Furthermore, the target device selects a reference resource per TRP, and compiles the measurements per TRP based on the selected reference resource.

Regarding RAT-dependent Positioning Measurements, the different DL measurements including DL PRS-RSRP, DL RSTD and UE Rx-Tx Time Difference required for the supported RAT-dependent positioning techniques are shown in Table 5. The following measurement configurations may be specified:

4 Pair of DL RSTD measurements can be performed per pair of cells. Each measurement is performed between a different pair of DL PRS Resources/Resource Sets with a single reference timing.

8 DL PRS RSRP measurements can be performed on different DL PRS resources from the same cell.

TABLE 5

| DL Measurements required for DL-based positioning methods | |
|---|---|
| | DL PRS reference signal received power (DL PRS-RSRP) |
| Definition | DL PRS reference signal received power (DL PRS-RSRP), is defined as the linear average over the power contributions (in [W]) of the resource elements that carry DL PRS reference signals configured for RSRP measurements within the considered measurement frequency bandwidth. For frequency range 1, the reference point for the DL PRS-RSRP shall be the antenna connector of the UE. For frequency range 2, DL PRS-RSRP shall be measured based on the combined signal from antenna elements corresponding to a given receiver branch. For frequency range 1 and 2, if receiver diversity is in use by the UE, the reported DL PRS-RSRP value shall not be lower than the corresponding DL PRS-RSRP of any of the individual receiver branches. |
| Applicable for | RRC_CONNECTED intra-frequency, RRC_CONNECTED inter-frequency |
| | DL reference signal time difference (DL RSTD) |
| Definition | DL reference signal time difference (DL RSTD) is the DL relative timing difference between the positioning node j and the reference positioning node i, defined as $T_{SubframeRxj} - T_{SubframeRxi}$, Where: $T_{SubframeRxj}$ is the time when the UE receives the start of one subframe from positioning node j. $T_{SubframeRxi}$ is the time when the UE receives the corresponding start of one subframe from positioning node i that is closest in time to the subframe received from positioning node j. Multiple DL PRS resources can be used to determine the start of one subframe from a positioning node. For frequency range 1, the reference point for the DL RSTD shall be the antenna connector of the UE. For frequency range 2, the reference point for the DL RSTD shall be the antenna of the UE. |
| Applicable for | RRC_CONNECTED intra-frequency RRC_CONNECTED inter-frequency |
| | UE Rx − Tx time difference |
| Definition | The UE Rx − Tx time difference is defined as $T_{UE-RX} - T_{UE-TX}$ Where: $T_{UE-RX}$ is the UE received timing of downlink subframe #i from a positioning node, defined by the first detected path in time. $T_{UE-TX}$ is the UE transmit timing of uplink subframe #j that is closest in time to the subframe #i received from the positioning node. Multiple DL PRS resources can be used to determine the start of one subframe of the first arrival path of the positioning node. For frequency range 1, the reference point for $T_{UE-RX}$ measurement shall be the Rx antenna connector of the UE and the reference point for $T_{UE-TX}$ measurement shall be the Tx antenna connector of the UE. For frequency range 2, the reference point for $T_{UE-RX}$ measurement shall be the Rx antenna of the UE and the reference point for $T_{UE-TX}$ measurement shall be the Tx antenna of the UE. |
| Applicable for | RRC_CONNECTED intra-frequency RRC_CONNECTED inter-frequency |

Regarding Regulatory Requirements for Unlicensed Operation, Rel-16 introduced NR operation in the unlicensed bands in a similar fashion to LTE Licensed Assisted Access ("LAA"). Operation in the unlicensed portions of the spectrum should adhere to the regional regulatory requirements, which introduces additional challenges when compared to operation in the licensed spectrum. Such regulatory requirements may include:

LBT (CCA): The mechanism by which an equipment, e.g., UE applies CCA before using the channel.

Maximum COT ("MCOT"): Defines the maximum channel occupancy time which should not be greater than 95% Fixed Frame Period (defined by manufacturer within range between 1 ms and 10 ms) and shall be followed by an Idle Period until the start of the next Fixed Frame Period such that the Idle Period is at least 5% of the Channel Occupancy Time, with a minimum of 100 μs.

Effective/Equivalent Isotropic Radiated Power ("EIRP") and power spectral density ("PSD"): The energy detection ("ED") Threshold Level ("TL"), at the input of the receiver, shall be proportional to the maximum transmit power ("PH") according to the formula which assumes a 0 dBi receive antenna and PH to be specified in dBm e.i.r.p. The Power Density is the mean equivalent isotropically radiated power (e.i.r.p.) density during a transmission burst.

Occupied Channel Bandwidth ("OCB"): The OCB shall be between 80% and 100% of the Nominal Channel Bandwidth. In case of smart antenna systems (devices with multiple transmit chains) each of the transmit chains shall meet this requirement. The Occupied Channel Bandwidth might change with time/payload.

Dynamic Frequency Selection ("DFS"): A radio LAN ("RLAN") shall employ a DFS function to:

detect interference from radar systems (radar detection) and to avoid co-channel operation with these systems:

provide on aggregate a near-uniform loading of the spectrum (Uniform Spreading).

Frequency Reuse ("FR"): The FR is reduced when multiple devices access the same carrier at the same time period. For unlicensed band operations, other devices should be muted when a single device accesses the carrier.

Figure 5:
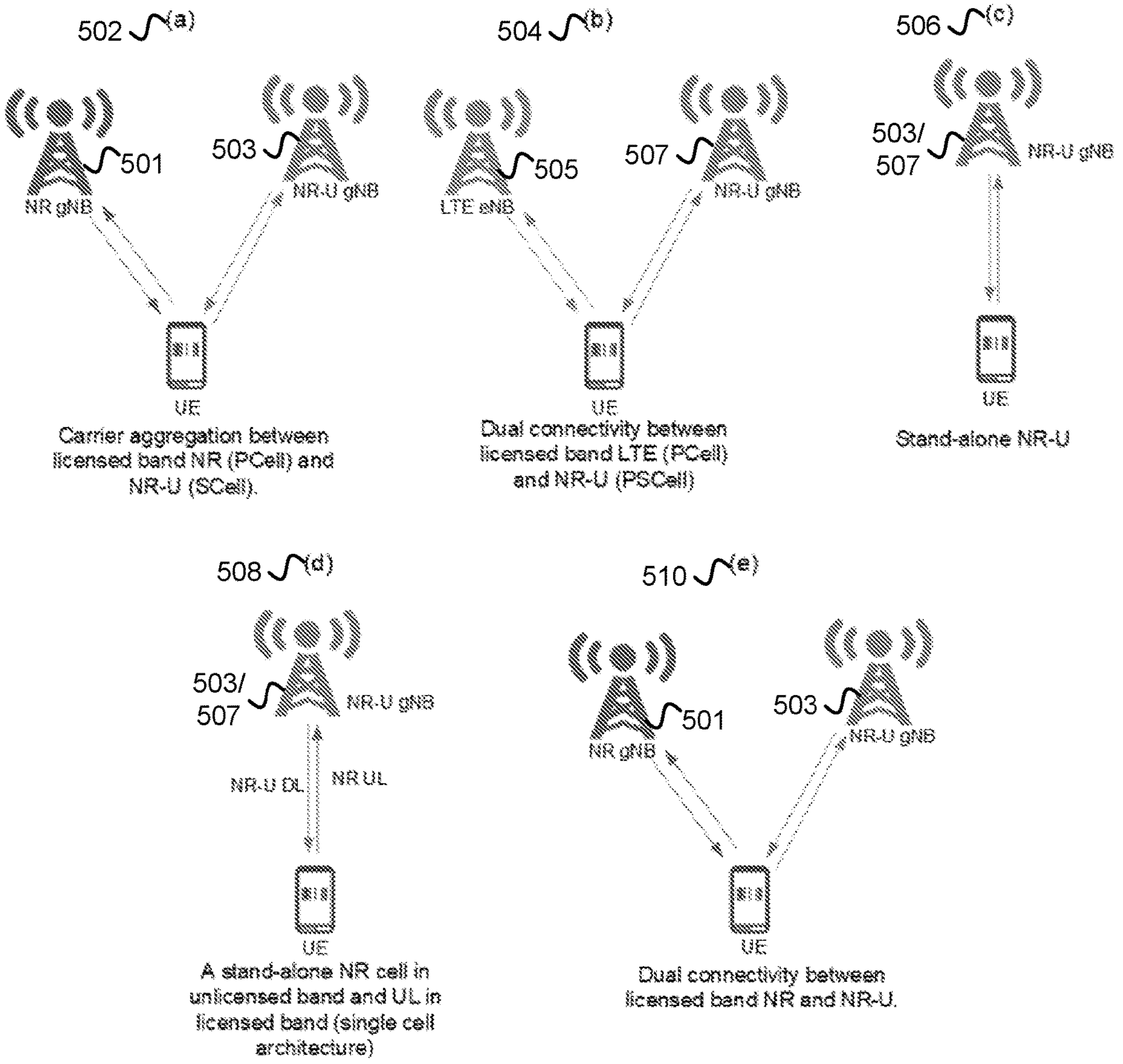
FIG. 5 depicts one embodiment of NR-U deployment scenarios.

Regarding NR-U Deployment Scenarios, FIG. 5 shows the different NR-U deployment scenarios. In line with NR development and in order to maximize the applicability of NR-based unlicensed access, the SI considered the following scenarios:

Scenario A 502: Carrier aggregation between licensed band NR (PCell) 501 and NR-U (SCell) 503 a. NR-U SCell 503 may have both DL and UL, or DL-only b. In this scenario, NR PCell 501 is connected to 5G-CN Scenario B 504: Dual connectivity between licensed band LTE (PCell) 505 and NR-U (PSCell) 507 c. In this scenario, LTE PCell 505 connected to EPC as higher priority than PCell 501 connected to 5G-CN Scenario C 506: Stand-alone NR-U 503/507 d. In this scenario, NR-U 503/507 is connected to 5G-CN

Scenario D 508: A stand-alone NR cell 503/507 in unlicensed band and UL in licensed band e. In this scenario, NR-U 503/507 is connected to 5G-CN Scenario E 510: Dual connectivity between licensed band NR 501 and NR-U 503.

f. In this scenario, PCell 501 is connected to 5G-CN

All these scenarios are deemed to be of interest for different applications and/or use cases and were considered to be feasible. The work on Scenario E 510, in particular, has also leveraged the work conducted on "Multi-RAT Dual-Connectivity and Carrier Aggregation enhancements" (LTE_NR_DC_CA_enh-Core). Note that carrier aggregation across NR-U cells was also in the scope of all the above scenarios.

Regarding channel access schemes, the channel access schemes for NR-based access for unlicensed spectrum can be classified into the following categories:

Category 1: Immediate Transmission after a Short Switching Gap g. This is used for a transmitter to immediately transmit after a switching gap inside a COT.

h. The switching gap from reception to transmission is to accommodate the transceiver turnaround time and is no longer than 16 μs.

Category 2: LBT without Random Back-Off i. The duration of time that the channel is sensed to be idle before the transmitting entity transmits is deterministic.

Category 3: LBT with Random Back-Off with a Contention Window of Fixed Size j. The LBT procedure has the following procedure as one of its components. The transmitting entity draws a random number N within a contention window. The size of the contention window is specified by the minimum and maximum value of N. The size of the contention window is fixed. The random number N is used in the LBT procedure to determine the duration of time that the channel is sensed to be idle before the transmitting entity transmits on the channel.

Category 4: LBT with Random Back-Off with a Contention Window of Variable Size k. The LBT procedure has the following as one of its components. The transmitting entity draws a random number N within a contention window. The size of contention window is specified by the minimum and maximum value of N. The transmitting entity can vary the size of the contention window when drawing the random number N. The random number N is used in the LBT procedure to determine the duration of time that the channel is sensed to be idle before the transmitting entity transmits on the channel.

l. For different transmissions in a COT and different channels/signals to be transmitted, different categories of channel access schemes can be used.

The present disclosure provides enhancements for performing RAT-based positioning using NR in several unlicensed spectrum scenarios/deployments. It is noted that Embodiments 1-4 discussed below may be implemented in combination with each other to enable the configuration of positioning assistance data assistance data over unlicensed bands (carriers). Furthermore, it is noted that for the purposes of this disclosure, a positioning-related reference signal may refer to a reference signal used for positioning procedures/purposes in order to estimate a target-UE's location, e.g., PRS or based on existing reference signals such as SRS: a target-UE can be referred to as the device/entity to be localized/positioned.

In one embodiment, a method is disclosed for the location server/LMF to transmit an unlicensed positioning-related reference signal configuration in a burst fashion over an unlicensed carrier to accommodate a gNB or UE initiated channel occupancy time (COT). An associated measurement window is proposed to be configured to measure the DL-PRS burst transmission.

In one embodiment, a method is disclosed to configure the UE with a CAPC for the purposes of positioning depending on the positioning service level.

In one embodiment, a method is disclosed to coordinate the unlicensed (and/or licensed) positioning-related reference signal transmission from multiple TRPs including serving and non-serving gNBs to support higher accuracy timing-based positioning methods such as DL-TDOA and multi-RTT.

In one embodiment, a method is disclosed for the LMF to configure the Multi-RTT positioning method using the same UE initiated COT.

In one embodiment, a method is disclosed to enable the UE to jointly process the DL-PRS bursts across different positioning frequency layers that span only licensed carriers, only unlicensed carriers, or a combination of licensed and unlicensed carriers. In such an embodiment, the UE may jointly measure the DL-PRS bursts using a gap-less configuration, i.e., without the need of a measurement gap. In one embodiment, LBT success/failure reports and partial measurements may be transmitted to the LMF as assistance information to optimize the location estimate calculation over unlicensed bands.

In one embodiment, a method is disclosed to update the QCL assumption of the transmission of the DL-PRS burst to enable directional LBT or short controlling signaling or no LBT in higher frequency bands.

In one embodiment, the solution proposed herein may provide:

An adapted positioning-related reference signal configuration enables the UE to measure the positioning-related reference signals despite the constraints of an unguaranteed transmission opportunity.

The joint processing of the DL-PRS bursts using both licensed and unlicensed carriers can improve the overall location estimate accuracy.

Assistance information provided by the UE and gNB regarding the quality of the positioning measurement and LBT success/failures can assist the LMF in optimizing the measurements used to compute the target-UE's location estimate.

Rapid update of the QCL assumption between the location server and base station can enable directional LBT procedures.

The present embodiments include methods to enable positioning in unlicensed portions of the spectrum, more specifically for the location server to coordinate and manage positioning-related reference signal transmissions adapted to a given transmission opportunity as well as to suitably configure the target-UE in an effective manner.

In one embodiment, channel access priority classes for positioning are disclosed. This embodiment describes the mechanisms that enable the location server (LMF) to configure positioning assistance data to be measured by the UE over the 1) Unlicensed-band 2) licensed-assisted access mechanism.

The position-related reference signals over the unlicensed carrier would have to be transmitted in a burst manner to satisfy the channel access mechanisms, which form part of the regulatory framework. The DL-PRS resource burst configuration is transmitted in such a manner that the UE can measure the RSTD, UE Rx-Tx time difference and DL-RSRP within an available COT.

In one embodiment, a plurality of CAPC can be an integer indication of the prioritized positioning procedures or methods and can be applied for the following positioning procedures:

From the gNB and LMF perspective, in one embodiment:

Transmission of the positioning capability request message by the LMF, e.g., RequestCapabilities LTE positioning protocol ("LPP") message Transmission of the DL-PRS resource configuration, e.g., Provide Assistance Data LPP message:

in an omnidirectional manner by the reference gNB and neighboring gNBs in a beam-sweeping manner by the reference gNB and neighboring gNBs Transmission of the request for measurements and/or UE location information, e.g., RequestLocationInformation LPP message.

Transmission of the aforementioned messages using RRC, MAC CE, downlink control information ("DCI") signaling, or a combination thereof, provided that the LMF is co-located with the RAN node or comprises a full set or subset of functionality of the LMF (e.g., location server).

Transmission of CAPC value, duration of COT, maximum allowed gaps, type of LBT to be performed such as LBT cat 4 and whether LBT cat 2 needs to be performed when gaps arise (e.g., COT sharing) and/or No-LBT.

From the UE perspective, in one embodiment:

Transmission of the provided positioning capability message by the LMF, e.g., ProvideCapabilities LPP message.

Transmission of the request of assistance data as described in Embodiment 1.

Transmission of the positioning measurement report and/or location information by the UE, e.g., Provide LocationInformation LPP message.

Procedures common to both UE and LMF, in one embodiment:

Transmission of the abort message to terminate an ongoing LPP session.

Transmission of an error message to indicate which messages or segments of an LPP are corrupted or contain errors.

In another implementation, the CAPC may be mapped according to the positioning service level configured by the base station (e.g., gNB) or LMF, which is a function of positioning quality-of-service indicators such as horizontal and vertical absolute and relative positioning accuracies, positioning service availability, positioning service latency, velocity, and coverage area as, shown in Table 6. DCI signaling (e.g., format 0_1) can be used to configure the positioning CAPC to the UE, if the positioning service level ("PSL") is known to the base station. The base station may receive such PSL information from the LMF via NR Positioning Protocol Annex ("NRPPa") signaling. In an alternative implementation, LPP signaling can be used to configure the positioning CAPC to the UE.

TABLE 6

Exemplary Positioning Service Levels to CAPC Mapping

| CAPC | Positioning Service Level | Absolute (A)/ Relative (R) Positioning | Horizontal Accuracy | Vertical Accuracy | Positioning Service Availability | Positioning Service Latency | Velocity and Coverage Area |
|---|---|---|---|---|---|---|---|
| 1 | 1 | A | 10 m | 3 m | 95% | 1 s | Indoor - Up to 30 km/ Outdoor (rural and urban) up to 250 km/h |

TABLE 6-continued

Exemplary Positioning Service Levels to CAPC Mapping

| CAPC | Positioning Service Level | Absolute (A)/ Relative (R) Positioning | Horizontal Accuracy | Vertical Accuracy | Positioning Service Availability | Positioning Service Latency | Velocity and Coverage Area |
|---|---|---|---|---|---|---|---|
| 2 | 2 | A | 3 m | 3 m | 99% | 1 s | Outdoor (rural and urban) up to 500 km/h for trains and up to 250 km/h for other vehicles |
| 3 | 3 | A | 1 m | 2 m | 99% | 1 s | Outdoor (rural and urban) up to 500 km/h for trains and up to 250 km/h for other vehicles |
| 4 | 4 | A | 1 m | 2 m | 99.9% | 15 ms | NA |
| 5 | 5 | A | 0.3 m | 2 m | 99% | 1 s | Outdoor (rural) up to 250 km/h |
| 6 | 6 | A | 0.3 m | 2 m | 99.9% | 10 ms | NA |
| 7 | 7 | R | 0.2 m | 0.2 m | 99% | 1 s | Indoor and outdoor (rural, urban, dense urban) up to 30 km/h Relative positioning is between two UEs within 10 m of each other or between one UE and 5G positioning nodes within 10 m of each other |

The CAPC mapping shown in Table 7 can comprise of a corresponding mapping of the positioning service level based on the stringent accuracy and/or latency requirements.

TABLE 7

Exemplary mapping of CAPC to PSL

| CAPC | Positioning Service Level |
|---|---|
| 1 | 7, 6, 5, 4 |
| 2 | 3 |
| 3 | 2 |
| 4 | 1 |

In a second embodiment, PRS/SRS Burst configuration for timing-based positioning methods is disclosed. In this embodiment, the specific assistance data configuration aspects required by the reference base station (e.g., gNB) and neighboring base stations to coordinate the transmission of DL-PRS for enabling DL-TDOA are disclosed. Proposals for further coordination of the transmission opportunity required for enabling Multi-RTT between a 1) serving base station and a target-UE and 2) neighboring base station and target UE are provided.

In one embodiment, the LMF can (pre-) configure the window size, start times, end times, periodicity for the transmission of PRS or SRS burst transmission, and the gNB/UE may further perform LBT within the window for transmitting PRS in DL or SRS in UL. The LMF, in one embodiment, also configures the LBT occasions within the window, wherein the LBT occasions are configured as a slot/symbol offset corresponding to each window. Various characteristics may be associated with the a (pre-) configured measurement window.

In one embodiment, the window size depends on the positional accuracy requirements, positioning method, desired time to first fix ("TTFF"), e.g., High accuracy requirements known to the LMF, e.g., higher accuracy location estimates would require a larger measurement window size over which to average a larger set of DL-PRS burst measurements.

In one embodiment, the DL-PRS measurement window size can be configured from the start of the first measured DL-PRS resource set ID to the last measured DL-PRS resource set ID within a burst configuration and it is similarly configured for SRS.

In one embodiment, the LMF can signal the DL-PRS burst configuration and corresponding measurement window to the UE via e.g., the ProvideAssistanceData or RequestLocationInformation LPP messages. This may be transmitted via LPP dedicated signaling (using scheduled PDSCH transmission) from the serving gNB based on a gNB initiated COT.

In an alternate embodiment, the DL-PRS burst configuration be transmitted via system information broadcast (e.g., posSIBs) for multiple UEs intending to perform positioning over the unlicensed band.

In one embodiment, the MCOT should take into consideration the DL-PRS burst measurement window Size, such that the duration of the MCOT≥DL-PRS Measurement Window Size. In an alternative implementation, short control signal transmission with a sliding window (up to e.g., 10 ms within a 100 ms sliding window size)≥PRS Measurement Window Size.

In one embodiment, the DL-PRS/SRS burst configuration can be a:

- One-shot transmission, corresponding to one DL-PRS occasion/sample, which can be measured with a good degree of accuracy depending on the link condition, e.g., high receiver SNR/SINR: or a
- Periodic DL-PRS burst transmissions are also supported provided the instance(s) of the periodic DL-PRS burst is transmitted within the COT or within the 10 ms allowable transmission time within an overall 100 ms window size.

In alternative implementations, the DL-PRS/SRS burst configuration and associated transmission window may be configured using DCI, MAC CE and/or RRC signaling provided that the gNB is co-located with the LMF or has a full set or partial/subset of functionality of the LMF (location server), e.g., having a location management component within a RAN node.

In the case of the DL-TDOA positioning method, in one embodiment, the DL-PRS burst configuration and measurement window configuration may be aligned with a plurality of gNBs that transmit the DL-PRS in order for the UE to measure the RSTD between a pair of gNBs. The solution supports the following two options.

In a first option, using an ideal backhaul, the LMF can request scheduling of the DL-PRS burst resources from the reference (primary) gNB and secondary (neighboring gNBs) via the NRPPa interface connecting the LMF with the NG-RAN nodes. In one embodiment, the reference gNB initiates a gNB initiated COT to transmit the PRS Burst configuration and associated measurement window configuration. In one embodiment, the reference gNB shares the COT with Neighboring (secondary) gNBs involved in the DL-TDOA positioning method to transmit DL-PRS in bursts via the Xn interface connecting the serving gNB with neighboring gNBs.

In a second option, using a non-ideal backhaul, for the case where the gNB is co-located with the LMF or has a full set or partial/subset of functionality of the LMF (location server), a single DCI may be used to schedule the PDSCH carrying the DL-PRS burst configuration from multiple TRPs of the reference gNB. Alternatively, in one embodiment, multiple DCIs may be signaled to the UE to schedule the PDSCH carrying the DL-PRS burst configuration.

In an alternative implementation, each of the participating gNBs in the configured DL-TDOA method each perform gNB initiated COT (each perform LBT depending on the recommended by the LMF). In one embodiment, in the case of the of the UE measuring RSTD measurements, the gNB initiated COT by each reference gNB and neighboring gNB should be executed within a recommend timing margin, in order to obtain accurate RSTD measurements. In one embodiment, a timer can be configured to both the gNBs and UE to indicate the validity of the DL-PRS burst transmissions and any DL-PRS transmissions received outside the validity of the timer are considered invalid for that specific configuration.

In another implementation, the UE may initiate COT sharing to accommodate the measurements made for the RSTD measurements from different pairs gNBs e.g., reference and neighboring gNB. This can be signaled to the LMF, e.g., via UL LPP messages. The LMF may then notify neighboring gNBs that a UE initiated COT has been started.

Figure 6:
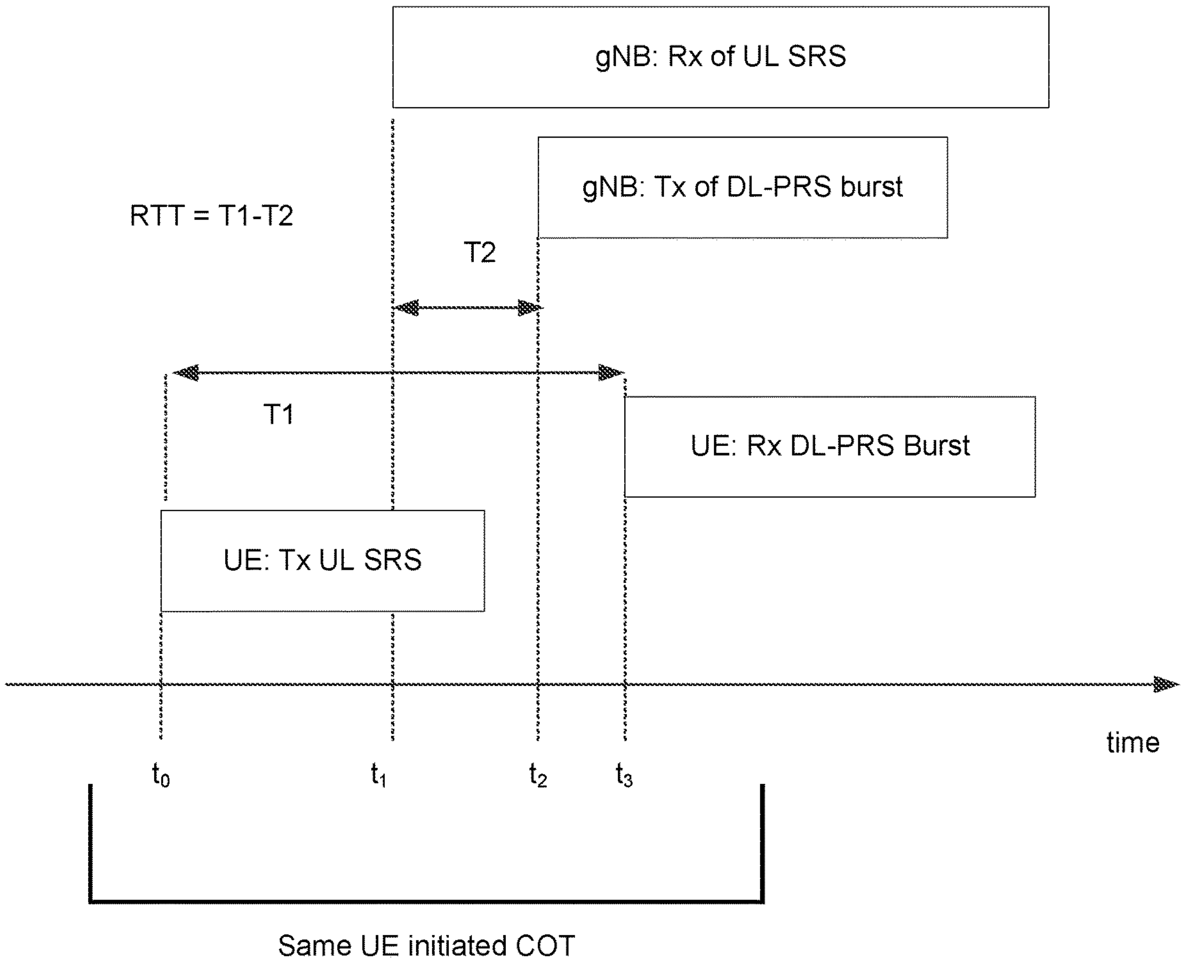
FIG. 6 depicts one embodiment of Multiple-Round Trip Time ("Multi-RTT") operation within same UE initiated COT.

In the case of the Multi-RTT positioning method, the same UE or gNB initiated COT should be used to perform the UE-gNB signaling exchange in order to determine the RTT. FIG. 6 is an exemplary illustration showing that the RTT signaling exchange involving the two key time durations from the gNB and UE perspective should be taking place within the UE initiated COT.

In one embodiment, the LMF may signal the gNB and UE via LPP that the multi-RTT measurements comprising of either gNB Rx-Tx time difference or UE Rx-Tx time difference will take place within the same gNB or UE initiated COT, respectively. Similarly, this operation may be extended to multiple cells where the same UE initiated COT can be used to derive UE Rx-Tx difference measurements from multiple gNBs or the same gNB initiated COT can be used to derive the gNB Rx-Tx time difference measurements from the target-UE.

In the case of the DL-AoD positioning method, the aforementioned DL-PRS and/or DL-PRS burst resource configuration and associated measurement configuration may also be applicable for the measurement of the DL-PRS RSRP in order to derive the UE's location estimate. In one implementation, the same (pre-) configured measurement window may be applicable to all configured positioning measurements, while in a different implementation, separate measurement windows may be associated to each of the described positioning techniques, e.g., DL-TDOA, Multi-RTT and DL-AoD.

A third embodiment is directed to joint aggregated DL-PRS burst processing across multiple carriers. In this embodiment, signaling mechanisms to support the transmission of the DL-PRS over aggregated unlicensed carriers or combination of licensed or unlicensed carriers is disclosed to exploit the wider bandwidths for improved accuracy.

In one embodiment, the LMF may configure the UE to jointly process the DL-PRS burst configuration across different positioning frequency layers in one or combination of licensed and/or unlicensed carriers, where a positioning frequency layer is a collection of DL PRS Resource Sets across one or more TRPs, which have:

- the same subcarrier spacing ("SCS") and cyclic prefix ("CP") type:
- the same center frequency:
- the same point-A:
- DL PRS Resources of the DL PRS Resource Set have the same bandwidth; and/or.
- DL PRS Resource Sets belonging to the same Positioning Frequency Layer have the same value of DL PRS Bandwidth and Start PRB.

The joint processing of the DL-PRS burst configuration may be signaled to the UE via LPP or RRC, MAC CE, DCI in the case that the gNB is co-located with the LMF or has a full set or partial/subset of functionality of the LMF (location server), e.g., having a location management component within a RAN node, or some combination thereof.

In one embodiment, the UE may request the gNB to configure a gap less configuration via RRC, e.g., without a measurement gap, where the UE need not measure the DL-PRS burst within a configured measurement gap, which may have a Measurement Gap Repetition Period of 20 ms and may exceed the COT duration. Subject to UE capability and depending on the gapless configuration:

- the DL-PRS burst to be measured may be contained within the active DL BWP of the serving cell:
- the DL-PRS burst to be measured may extend beyond the active DL BWP; and
- the DL-PRS burst to be measured may be contained within the LBT bandwidth of the transmitting gNB.

It is noted that, in one embodiment, DL-PRS burst measurements are applicable to both FR1, FR2, and beyond FR2 transmissions.

In one embodiment, the UE may signal indications to the LMF of full or partial DL-PRS measurements across the LBT bandwidths. This assistance information may enable the LMF to consider or discard measurements, where applicable. In some embodiments, the UE can be configured with either of the two modes, e.g., whether to consider partial DL-PRS measurements or not. In one implementation, when the UE is configured to not consider partial DL-PRS measurements, then the measurement report does not need any additional information such as which of the frequency resources are used for measurements.

In some implementations, when the UE is configured to consider partial DL-PRS measurements, then UE is expected to also report some information related to the frequency resources on which DL-PRS measurements are done. In some cases, the UE can indicate a fraction to signal the fraction of resources are used for measurements. For example, if a bandwidth ("BW") of 100 MHz is configured for DL-PRS transmissions and measurements, but if only 50 MHz is used, then UE can indicate 0.5 as the fraction value. In some embodiments, the UE can be configured to transmit the measurement report only when the fraction of resources for DL-PRS measurements are above a certain threshold.

Depending on the gNB or UE indications, LBT success/failure indications may be signaled to the LMF to help with resource reselection and scheduling of the DL-PRS bursts. In certain scenarios, this may assist the LMF in determining whether to consider the DL-PRS transmissions over licensed or unlicensed carriers. In one embodiment, the following signaling methods are supported to provide the indications to the LMF:

- The LMF and gNB may exchange signaling via NRPPa to request and provide the aforementioned indications using, e.g., TRP/positioning information request and response signaling or the gNB may directly update the LMF using the positioning information update procedure. These indications alert the LMF if DL-PRS was not/partially transmitted to help with the processing of measurements.
- The UE may signal the LMF via LPP to determine whether the reported measurements are full or partial measurements based on the initially configuration, e.g., using the ProvideLocationInformation LPP message.

In an extended implementation, statistics can be reported to the LMF from the gNB via the NRPPa interface to ascertain which TRPs/beams had LBT success/failures and thus accordingly update QCL assumptions using the on-demand PRS mechanism. Occurrences of continuous LBT failures at the gNB and/or UE may also be reported to the LMF as part of the statistics.

In another implementation, the gNB may autonomously switch from an unlicensed carrier to a licensed carrier to provide the assistance data. The gNB may then inform the LMF of this change via NRPPa signaling messages that it has configured the positioning assistance data using licensed or unlicensed carriers.

In a further embodiment regarding management of impairments related to the aggregation of DL-PRS resources, in terms of the tight timing delay requirements for aggregation of burst positioning reference signals in different carriers, impairments in phase continuity and timing alignment errors ("TAEs") should be compensated across different carriers to avoid degradation, which impacts the accuracy of the final positioning estimate.

In the case of the gNB transmitting the aggregated DL-PRS configuration or DL-PRS burst configuration over licensed and unlicensed carriers from separate transmit (Tx) antenna connectors or the UE transmitting aggregated SRS for positioning over licensed and unlicensed carriers, the following minimum timing conditions in Table 8 should be met depending on the positioning carrier aggregation configuration:

TABLE 8

TAE reporting from gNB or UE to LMF

| Positioning Carrier Aggregation (CA) Configuration | Minimum Timing Alignment Error Condition (Normal CA data transmissions) | Minimum Timing Alignment Error Condition for aggregated multi-carrier positioning |
|---|---|---|
| Intra-band contiguous CA, with or without MIMO or TX diversity | <65 ns | <25 ns |
| Intra-band non-contiguous CA, with or without MIMO or TX diversity | <3000 ns | — |
| Inter-band CA, with or without MIMO or TX diversity | <3000 ns | — |

The gNB may report the TAE via NRPPa signaling to the LMF regarding both the TAE for normal CA and/or TAE for positioning. Similarly, the UE may also report the TAE to the LMF via LPP regarding both the TAE for normal CA and/or TAE for positioning. In an extended implementation, the gNB (e.g., via NRPPa signaling) and UE (e.g., via LPP signaling) may report information related to any impairments in phase continuity to the LMF corresponding the transmitted positioning reference signal CA configuration.

In an alternative implementation, the UE may report the TAE and phase continuity impairments associated to a transmitted aggregated positioning reference signal transmission via RRC/MAC CE signaling to the gNB, which may be then forwarded to the LMF.

Based on the TAE information, the DL-PRS resources and the PRS window for each carrier is (re)-configured to compensate for this error. For example, longer PRS window (longer measurement) is used for higher TAE to converge the error to a small value, while shorter PRS window is used for lower TAE values.

In another implementation, the TAE may form part of the transmit timing error group (TEG) reporting to the LMF (via NRPPa or LPP signaling) associated with the transmissions of:

One or more UL SRS resources for the positioning purpose, which have the Tx timing errors within a certain margin One or more DL-PRS resources, which have the Tx timing errors within a certain margin.

These UL SRS resources for positioning or DL-PRS resources may span resources from one or more carriers (licensed or unlicensed).

The aforementioned aspects may form part of UE capability or feature or be subject to a device transmission requirement. Additionally, the CA configurations mentioned may be licensed, unlicensed or a combination thereof.

In a fourth embodiment directed to dynamic QCL assumption for DL-PRS burst transmissions, a method to update the QCL assumption of the DL-PRS burst configuration based on the LBT success/failure is proposed is disclosed. In one embodiment, the UE may initiate the on-demand PRS procedure to update the DL-PRS configuration including the QCL assumption of the affected TRPs based on certain directional LBT success/failure criteria. The LMF may then request the gNB to update the QCL assumption accordingly.

In an additional implementation, the QCL assumption may be updated to obviate the need for LBT by transmitting a DL-PRS burst over TRP/beam which has a narrow beamwidth. In one embodiment, the LMF can configure the UE to perform LBT in sequential or in a parallel manner on the beams associated with DL-PRS. The signalling procedure to configure the UE to perform LBT in a sequential or parallel manner may be based on a flag indication, e.g., 0=No LBT, 1=LBT in a sequential manner, 2=LBT in a parallel manner. This can be signalled via LPP (e.g., via the RequestlocationInformation message) or RRC signalling.

In some embodiments, the DL-PRS resource can be configured with multiple QCL assumptions (e.g., QCL type-D/spatial beams), wherein the CCA (LBT) can be performed using one or multiple beams. In one implementation, the LBT is done in a sequential manner and if the LBT is successful on one of the beams, then no further LBT is required on remaining beams and DL-PRS can be transmitted on the corresponding beam. In another implementation, the LBT is done in a parallel manner and if the LBT is successful on one of the beams, then DL-PRS is transmitted on the corresponding beam. In some cases, when LBT is successful on multiple beams (in a parallel manner), then the DL-PRS can be transmitted on the beam with lowest index.

Figure 7:
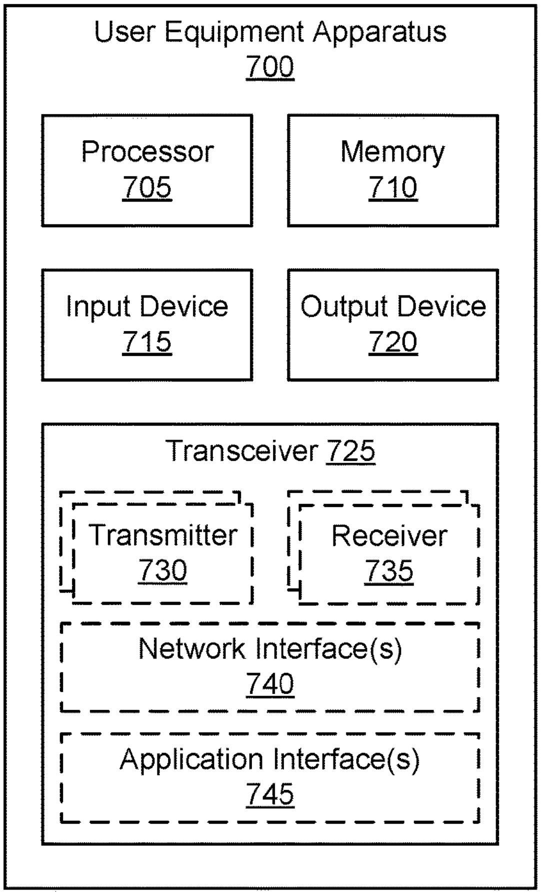
FIG. 7 is a block diagram illustrating one embodiment of a user equipment apparatus that may be used for positioning configuration and assistance data enhancements over unlicensed bands.

FIG. 7 depicts a user equipment apparatus 700 that may be used for positioning configuration and assistance data enhancements over unlicensed bands, according to embodiments of the disclosure. In various embodiments, the user equipment apparatus 700 is used to implement one or more of the solutions described above. The user equipment apparatus 700 may be one embodiment of a UE, such as the remote unit 105 and/or the UE 205, as described above. Furthermore, the user equipment apparatus 700 may include a processor 705, a memory 710, an input device 715, an output device 720, and a transceiver 725. In some embodiments, the input device 715 and the output device 720 are combined into a single device, such as a touchscreen. In certain embodiments, the user equipment apparatus 700 may not include any input device 715 and/or output device 720. In various embodiments, the user equipment apparatus 700 may include one or more of: the processor 705, the memory 710, and the transceiver 725, and may not include the input device 715 and/or the output device 720.

As depicted, the transceiver 725 includes at least one transmitter 730 and at least one receiver 735. Here, the transceiver 725 communicates with one or more base units 121. Additionally, the transceiver 725 may support at least one network interface 740 and/or application interface 745. The application interface(s) 745 may support one or more APIs. The network interface(s) 740 may support 3GPP reference points, such as Uu and PC5. Other network interfaces 740 may be supported, as understood by one of ordinary skill in the art.

The processor 705, in one embodiment, may include any known controller capable of executing computer-readable instructions and/or capable of performing logical operations. For example, the processor 705 may be a microcontroller, a microprocessor, a central processing unit ("CPU"), a graphics processing unit ("GPU"), an auxiliary processing unit, a field programmable gate array ("FPGA"), a digital signal processor ("DSP"), a co-processor, an application-specific processor, or similar programmable controller. In some embodiments, the processor 705 executes instructions stored in the memory 710 to perform the methods and routines described herein. The processor 705 is communicatively coupled to the memory 710, the input device 715, the output device 720, and the transceiver 725. In certain embodiments, the processor 705 may include an application processor (also known as "main processor") which manages application-domain and operating system ("OS") functions and a baseband processor (also known as "baseband radio processor") which manages radio functions.

The memory 710, in one embodiment, is a computer readable storage medium. In some embodiments, the memory 710 includes volatile computer storage media. For example, the memory 710 may include a RAM, including dynamic RAM ("DRAM"), synchronous dynamic RAM ("SDRAM"), and/or static RAM ("SRAM"). In some embodiments, the memory 710 includes non-volatile computer storage media. For example, the memory 710 may include a hard disk drive, a flash memory, or any other suitable non-volatile computer storage device. In some embodiments, the memory 710 includes both volatile and non-volatile computer storage media.

In some embodiments, the memory 710 stores data related to CSI enhancements for higher frequencies. For example, the memory 710 may store parameters, configurations, resource assignments, policies, and the like as described above. In certain embodiments, the memory 710 also stores program code and related data, such as an operating system or other controller algorithms operating on the user equipment apparatus 700, and one or more software applications.

The input device 715, in one embodiment, may include any known computer input device including a touch panel, a button, a keyboard, a stylus, a microphone, or the like. In some embodiments, the input device 715 may be integrated with the output device 720, for example, as a touchscreen or similar touch-sensitive display. In some embodiments, the input device 715 includes a touchscreen such that text may be input using a virtual keyboard displayed on the touchscreen and/or by handwriting on the touchscreen. In some embodiments, the input device 715 includes two or more different devices, such as a keyboard and a touch panel.

The output device 720, in one embodiment, is designed to output visual, audible, and/or haptic signals. In some embodiments, the output device 720 includes an electronically controllable display or display device capable of outputting visual data to a user. For example, the output device 720 may include, but is not limited to, an LCD display, an LED display, an OLED display, a projector, or similar display device capable of outputting images, text, or the like to a user. As another, non-limiting, example, the output device 720 may include a wearable display separate from, but communicatively coupled to, the rest of the user equipment apparatus 700, such as a smart watch, smart glasses, a heads-up display, or the like. Further, the output device 720 may be a component of a smart phone, a personal digital assistant, a television, a table computer, a notebook (laptop) computer, a personal computer, a vehicle dashboard, or the like.

In certain embodiments, the output device 720 includes one or more speakers for producing sound. For example, the output device 720 may produce an audible alert or notification (e.g., a beep or chime). In some embodiments, the output device 720 includes one or more haptic devices for producing vibrations, motion, or other haptic feedback. In some embodiments, all, or portions of the output device 720 may be integrated with the input device 715. For example, the input device 715 and output device 720 may form a touchscreen or similar touch-sensitive display. In other embodiments, the output device 720 may be located near the input device 715.

The transceiver 725 includes at least transmitter 730 and at least one receiver 735. The transceiver 725 may be used to provide UL communication signals to a base unit 121 and to receive DL communication signals from the base unit 121, as described herein. Similarly, the transceiver 725 may be used to transmit and receive SL signals (e.g., V2X communication), as described herein. Although only one transmitter 730 and one receiver 735 are illustrated, the user equipment apparatus 700 may have any suitable number of transmitters 730 and receivers 735. Further, the transmitter(s) 730 and the receiver(s) 735 may be any suitable type of transmitters and receivers. In one embodiment, the transceiver 725 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 725, transmitters 730, and receivers 735 may be implemented as physically separate components that access a shared hardware resource and/or software resource, such as for example, the network interface 740.

In various embodiments, one or more transmitters 730 and/or one or more receivers 735 may be implemented and/or integrated into a single hardware component, such as a multi-transceiver chip, a system-on-a-chip, an ASIC, or other type of hardware component. In certain embodiments, one or more transmitters 730 and/or one or more receivers 735 may be implemented and/or integrated into a multi-chip module. In some embodiments, other components such as the network interface 740 or other hardware components/circuits may be integrated with any number of transmitters 730 and/or receivers 735 into a single chip. In such embodiment, the transmitters 730 and receivers 735 may be logically configured as a transceiver 725 that uses one more common control signals or as modular transmitters 730 and receivers 735 implemented in the same hardware chip or in a multi-chip module.

In one embodiment, the processor 705 is configured to perform positioning procedures over an unlicensed band based on a configured CAPC for positioning, the CAPC corresponding to different positioning service levels. In one embodiment, the processor 705 is configured to receive, via the transceiver 725, a predetermined window size of a measurement window for positioning reference signal reception, a burst configuration, and a LBT occasion within the window from the location server based on an available reception opportunity to be measured and processed over the unlicensed band. In one embodiment, the processor 705 is configured to perform PRS measurement based on the measurement window, the burst configuration, and the LBT occasion.

In one embodiment, the processor 705 is configured to receive, via the transceiver 725, a measurement configuration for DL-PRS bursts across multiple positioning frequency layers.

In one embodiment, the processor 705 is configured to perform DL-PRS burst measurements and jointly process the measurements over multiple licensed carriers, unlicensed carriers, or combination thereof.

In one embodiment, the processor 705 is configured to receive, via the transceiver 725, an updated quasi-colocation assumption configuration to perform the positioning measurements over the unlicensed band.

In one embodiment, the processor 705 is configured to receive, via the transceiver 725, the DL-PRSs, which are configured in a burst-type manner, to be measured within COT.

In one embodiment, the DL-PRS burst measurement configuration is applicable to the RSTD, UE receiving-transmitting time difference, DL-RSRP measurements, or a combination thereof.

In one embodiment, the processor 705 is configured to receive, via the transceiver 725, the DL-PRS burst measurement configuration via a dedicated LTE positioning protocol, a positioning system information broadcast message, or a combination thereof.

In one embodiment, the processor 705 is configured to receive, via the transceiver 725, the DL-PRS burst measurement configuration at one time instance or in a periodic manner.

In one embodiment, the processor 705 is configured to receive, via the transceiver 725, an updated quasi-colocation assumption associated with the DL-PRS burst configuration based on a directional LBT configuration.

In one embodiment, the CAPC is defined for a positioning service based on positioning QOS indicators, a positioning procedure, or a combination thereof.

In one embodiment, the measurement window with the predetermined window size is based on the positioning QOS indicators, a COT, or a combination thereof.

In one embodiment, the processor 705 is configured to report a timing alignment error, a phase continuity error, or a combination thereof, associated with a positioning reference signal carrier aggregation configuration over a licensed carrier, an unlicensed carrier, or a combination thereof.

In one embodiment, the processor 705 is configured to provide signal indications associated with a positioning measurement indicating whether a full measurement or partial measurement was performed.

Figure 8:
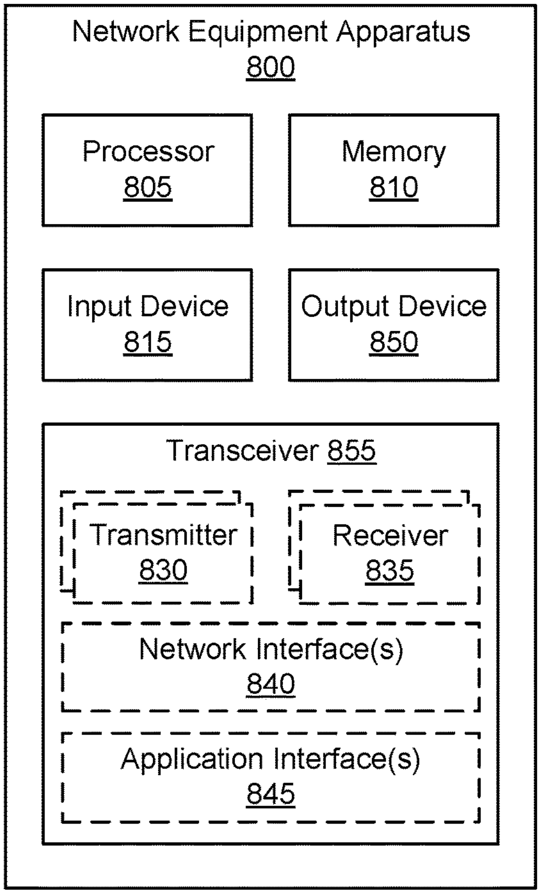
FIG. 8 is a block diagram illustrating one embodiment of a network apparatus that may be used for positioning configuration and assistance data enhancements over unlicensed bands.

FIG. 8 depicts one embodiment of a network apparatus 800 that may be used for positioning configuration and assistance data enhancements over unlicensed bands, according to embodiments of the disclosure. In some embodiments, the network apparatus 800 may be one embodiment of a RAN node and its supporting hardware, such as the base unit 121 and/or gNB, described above. Furthermore, network apparatus 800 may include a processor 805, a memory 810, an input device 815, an output device 820, and a transceiver 825. In certain embodiments, the network apparatus 800 does not include any input device 815 and/or output device 820.

As depicted, the transceiver 825 includes at least one transmitter 830 and at least one receiver 835. Here, the transceiver 825 communicates with one or more remote units 105. Additionally, the transceiver 825 may support at least one network interface 840 and/or application interface 845. The application interface(s) 845 may support one or more APIs. The network interface(s) 840 may support 3GPP reference points, such as Uu, N1, N2, N3, N5, N6 and/or N7 interfaces. Other network interfaces 840 may be supported, as understood by one of ordinary skill in the art.

The processor 805, in one embodiment, may include any known controller capable of executing computer-readable instructions and/or capable of performing logical operations. For example, the processor 805 may be a microcontroller, a microprocessor, a central processing unit ("CPU"), a graphics processing unit ("GPU"), an auxiliary processing unit, a field programmable gate array ("FPGA"), a digital signal processor ("DSP"), a co-processor, an application-specific processor, or similar programmable controller. In some embodiments, the processor 805 executes instructions stored in the memory 810 to perform the methods and routines described herein. The processor 805 is communicatively coupled to the memory 810, the input device 815, the output device 820, and the transceiver 825. In certain embodiments, the processor 805 may include an application processor (also known as "main processor") which manages application-domain and operating system ("OS") functions and a baseband processor (also known as "baseband radio processor") which manages radio function. In various embodiments, the processor 805 controls the network apparatus 800 to implement the above described network entity behaviors (e.g., of the gNB) for positioning configuration and assistance data enhancements over unlicensed bands.

The memory 810, in one embodiment, is a computer readable storage medium. In some embodiments, the memory 810 includes volatile computer storage media. For example, the memory 810 may include a RAM, including dynamic RAM ("DRAM"), synchronous dynamic RAM ("SDRAM"), and/or static RAM ("SRAM"). In some embodiments, the memory 810 includes non-volatile computer storage media. For example, the memory 810 may include a hard disk drive, a flash memory, or any other suitable non-volatile computer storage device. In some embodiments, the memory 810 includes both volatile and non-volatile computer storage media.

In some embodiments, the memory 810 stores data relating to CSI enhancements for higher frequencies. For example, the memory 810 may store parameters, configurations, resource assignments, policies, and the like as described above. In certain embodiments, the memory 810 also stores program code and related data, such as an operating system ("OS") or other controller algorithms operating on the network apparatus 800, and one or more software applications.

The input device 815, in one embodiment, may include any known computer input device including a touch panel, a button, a keyboard, a stylus, a microphone, or the like. In some embodiments, the input device 815 may be integrated with the output device 820, for example, as a touchscreen or similar touch-sensitive display. In some embodiments, the input device 815 includes a touchscreen such that text may be input using a virtual keyboard displayed on the touchscreen and/or by handwriting on the touchscreen. In some embodiments, the input device 815 includes two or more different devices, such as a keyboard and a touch panel.

The output device 820, in one embodiment, may include any known electronically controllable display or display device. The output device 820 may be designed to output visual, audible, and/or haptic signals. In some embodiments, the output device 820 includes an electronic display capable of outputting visual data to a user. Further, the output device 820 may be a component of a smart phone, a personal digital assistant, a television, a table computer, a notebook (laptop) computer, a personal computer, a vehicle dashboard, or the like.

In certain embodiments, the output device 820 includes one or more speakers for producing sound. For example, the output device 820 may produce an audible alert or notification (e.g., a beep or chime). In some embodiments, the output device 820 includes one or more haptic devices for producing vibrations, motion, or other haptic feedback. In some embodiments, all, or portions of the output device 820 may be integrated with the input device 815. For example, the input device 815 and output device 820 may form a touchscreen or similar touch-sensitive display. In other embodiments, all, or portions of the output device 820 may be located near the input device 815.

As discussed above, the transceiver 825 may communicate with one or more remote units and/or with one or more interworking functions that provide access to one or more PLMNs. The transceiver 825 may also communicate with one or more network functions (e.g., in the mobile core network 80). The transceiver 825 operates under the control of the processor 805 to transmit messages, data, and other signals and also to receive messages, data, and other signals. For example, the processor 805 may selectively activate the transceiver (or portions thereof) at particular times in order to send and receive messages.

The transceiver 825 may include one or more transmitters 830 and one or more receivers 835. In certain embodiments, the one or more transmitters 830 and/or the one or more receivers 835 may share transceiver hardware and/or circuitry. For example, the one or more transmitters 830 and/or the one or more receivers 835 may share antenna(s), antenna tuner(s), amplifier(s), filter(s), oscillator(s), mixer(s), modulator/demodulator(s), power supply, and the like.

In one embodiment, the transceiver 825 implements multiple logical transceivers using different communication protocols or protocol stacks, while using common physical hardware.

In one embodiment, the processor 805 is configured to generate and transmit, to the UE via the transceiver 825, a DL-PRS resource configuration. In one embodiment, the processor 805 is configured to transmit, to the UE via the transceiver 825, a request to perform positioning measurements over an unlicensed band according to the DL-PRS resource configuration, the request comprising a configured CAPC for positioning, a predetermined window size of a measurement window for positioning reference signal reception, a burst configuration, and a LBT occasion within the window based on an available reception opportunity to be measured and processed over the unlicensed band, the CAPC corresponding to different positioning service levels.

Figure 9:
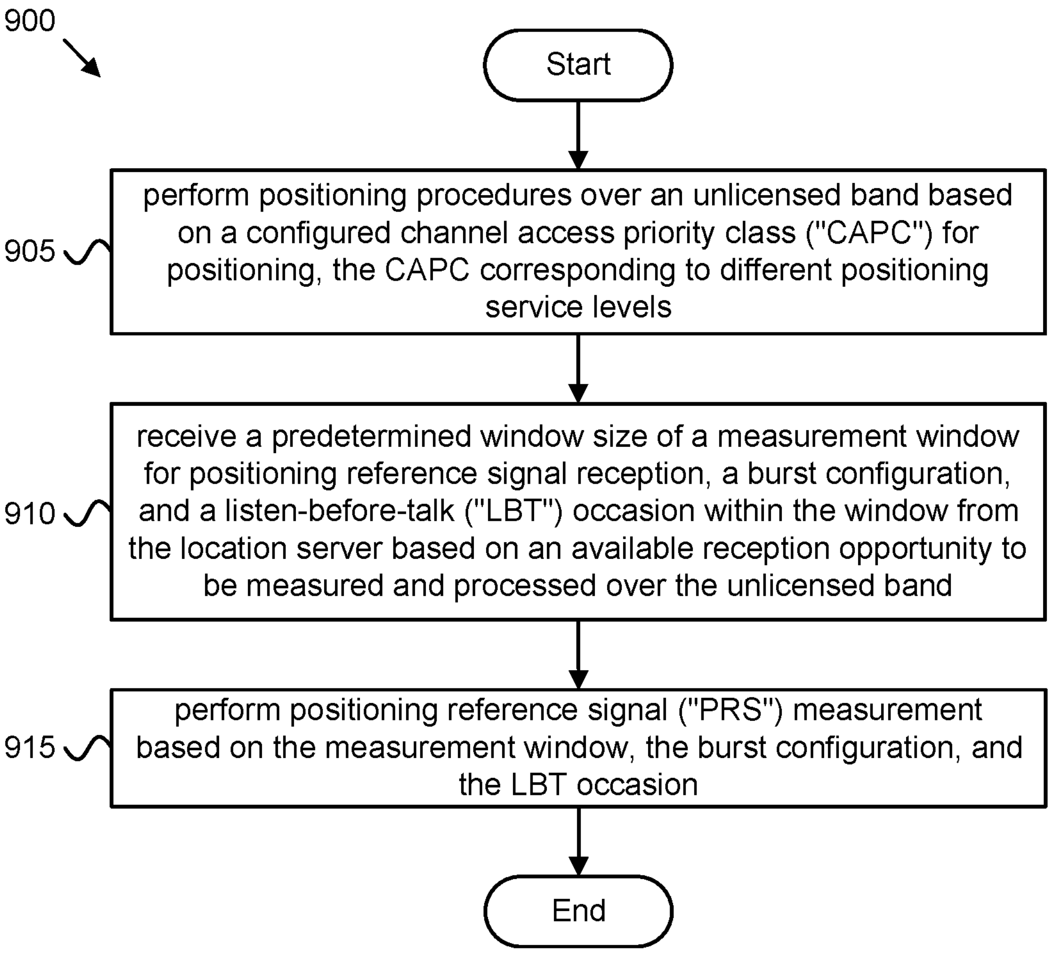
FIG. 9 is a flowchart diagram illustrating one embodiment of a method for positioning configuration and assistance data enhancements over unlicensed bands.

FIG. 9 is a flowchart diagram of a method 900 for positioning configuration and assistance data enhancements over unlicensed bands. The method 900 may be performed by a UE as described herein, for example, the remote unit 105 and/or the user equipment apparatus 700. In some embodiments, the method 900 may be performed by a processor executing program code, for example, a microcontroller, a microprocessor, a CPU, a GPU, an auxiliary processing unit, a FPGA, or the like.

In one embodiment, the method 900 begins and performs 905 positioning procedures over an unlicensed band based on a configured channel access priority class ("CAPC") for positioning, the CAPC corresponding to different positioning service levels. In one embodiment, the method 900 receives 910 a predetermined window size of a measurement window for positioning reference signal reception, a burst configuration, and a listen-before-talk ("LBT") occasion within the window from the location server based on an available reception opportunity to be measured and processed over the unlicensed band. In one embodiment, the method 900 performs 915 positioning reference signal ("PRS") measurement based on the measurement window, the burst configuration, and the LBT occasion, and the method 900 ends.

Figure 10:
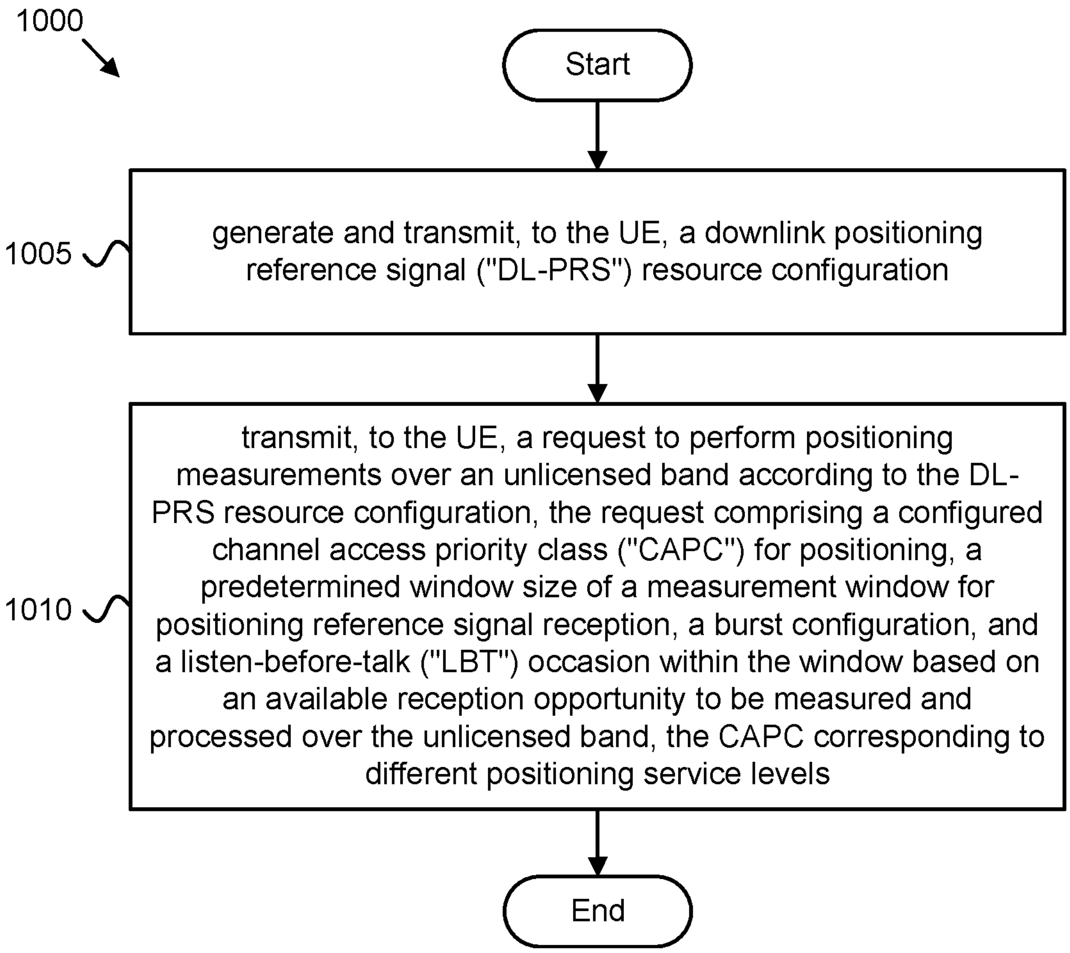
FIG. 10 is a flowchart diagram illustrating one embodiment of another method for positioning configuration and assistance data enhancements over unlicensed bands.

FIG. 10 is a flowchart diagram of a method 1000 for positioning configuration and assistance data enhancements over unlicensed bands. The method 1000 may be performed by a network entity as described herein, for example, the gNB, base station 121, a network function (e.g., an LMF), and/or the network equipment apparatus 800. In some embodiments, the method 1000 may be performed by a processor executing program code, for example, a microcontroller, a microprocessor, a CPU, a GPU, an auxiliary processing unit, a FPGA, or the like.

In one embodiment, the method 1000 begins and generates 1005 and transmits, to the UE, a downlink positioning reference signal ("DL-PRS") resource configuration. In one embodiment, the method 1000 transmits 1010, to the UE, a request to perform positioning measurements over an unlicensed band according to the DL-PRS resource configuration, the request comprising a configured channel access priority class ("CAPC") for positioning, a predetermined window size of a measurement window for positioning reference signal reception, a burst configuration, and a listen-before-talk ("LBT") occasion within the window based on an available reception opportunity to be measured and processed over the unlicensed band, the CAPC corresponding to different positioning service levels, and the method 1000 ends.

A first apparatus is disclosed for positioning configuration and assistance data enhancements over unlicensed bands. The first apparatus may include a UE as described herein, for example, the remote unit 105 and/or the user equipment apparatus 700. In some embodiments, the first apparatus includes a processor executing program code, for example, a microcontroller, a microprocessor, a CPU, a GPU, an auxiliary processing unit, a FPGA, or the like.

In one embodiment, the first apparatus includes a transceiver and a processor coupled to the transceiver. In one embodiment, the processor is configured to cause the apparatus to perform positioning procedures over an unlicensed band based on a configured CAPC for positioning, the CAPC corresponding to different positioning service levels. In one embodiment, the processor is configured to cause the apparatus to receive a predetermined window size of a measurement window for positioning reference signal reception, a burst configuration, and a LBT occasion within the window from the location server based on an available reception opportunity to be measured and processed over the unlicensed band. In one embodiment, the processor is configured to cause the apparatus to perform PRS measurement based on the measurement window, the burst configuration, and the LBT occasion.

In one embodiment, the processor is configured to cause the apparatus to receive a measurement configuration for DL-PRS bursts across multiple positioning frequency layers.

In one embodiment, the processor is configured to cause the apparatus to perform DL-PRS burst measurements and jointly process the measurements over multiple licensed carriers, unlicensed carriers, or combination thereof.

In one embodiment, the processor is configured to cause the apparatus to receive an updated quasi-colocation assumption configuration to perform the positioning measurements over the unlicensed band.

In one embodiment, the processor is configured to cause the apparatus to receive the DL-PRSs, which are configured in a burst-type manner, to be measured within COT.

In one embodiment, the DL-PRS burst measurement configuration is applicable to the RSTD, UE receiving-transmitting time difference, DL-RSRP measurements, or a combination thereof.

In one embodiment, the processor is configured to cause the apparatus to receive the DL-PRS burst measurement configuration via a dedicated LTE positioning protocol, a positioning system information broadcast message, or a combination thereof.

In one embodiment, the processor is configured to cause the apparatus to receive the DL-PRS burst measurement configuration at one time instance or in a periodic manner.

In one embodiment, the processor is configured to cause the apparatus to receive an updated quasi-colocation assumption associated with the DL-PRS burst configuration based on a directional LBT configuration.

In one embodiment, the CAPC is defined for a positioning service based on positioning QOS indicators, a positioning procedure, or a combination thereof.

In one embodiment, the measurement window with the predetermined window size is based on the positioning QOS indicators, a COT, or a combination thereof.

In one embodiment, the processor is configured to cause the apparatus to report a timing alignment error, a phase continuity error, or a combination thereof, associated with a positioning reference signal carrier aggregation configuration over a licensed carrier, an unlicensed carrier, or a combination thereof.

In one embodiment, the processor is configured to cause the apparatus to provide signal indications associated with a positioning measurement indicating whether a full measurement or partial measurement was performed.

A first method is disclosed for positioning configuration and assistance data enhancements over unlicensed bands. The first method may be performed by a UE as described herein, for example, the remote unit 105 and/or the user equipment apparatus 700. In some embodiments, the first method may be performed by a processor executing program code, for example, a microcontroller, a microprocessor, a CPU, a GPU, an auxiliary processing unit, a FPGA, or the like.

In one embodiment, the first method performs positioning procedures over an unlicensed band based on a configured CAPC for positioning, the CAPC corresponding to different positioning service levels. In one embodiment, first method receives a predetermined window size of a measurement window for positioning reference signal reception, a burst configuration, and a LBT occasion within the window from the location server based on an available reception opportunity to be measured and processed over the unlicensed band. In one embodiment, the first method performs PRS measurement based on the measurement window, the burst configuration, and the LBT occasion.

In one embodiment, the first method receives a measurement configuration for DL-PRS bursts across multiple positioning frequency layers.

In one embodiment, the first method performs DL-PRS burst measurements and jointly process the measurements over multiple licensed carriers, unlicensed carriers, or combination thereof.

In one embodiment, the first method receives an updated quasi-colocation assumption configuration to perform the positioning measurements over the unlicensed band.

In one embodiment, the first method receives the DL-PRSs, which are configured in a burst-type manner, to be measured within COT.

In one embodiment, the DL-PRS burst measurement configuration is applicable to the RSTD, UE receiving-transmitting time difference, DL-RSRP measurements, or a combination thereof.

In one embodiment, the first method receives the DL-PRS burst measurement configuration via a dedicated LTE positioning protocol, a positioning system information broadcast message, or a combination thereof.

In one embodiment, the first method receives the DL-PRS burst measurement configuration at one time instance or in a periodic manner.

In one embodiment, the first method receives an updated quasi-colocation assumption associated with the DL-PRS burst configuration based on a directional LBT configuration.

In one embodiment, the CAPC is defined for a positioning service based on positioning QOS indicators, a positioning procedure, or a combination thereof.

In one embodiment, the measurement window with the predetermined window size is based on the positioning QOS indicators, a COT, or a combination thereof.

In one embodiment, the first method reports a timing alignment error, a phase continuity error, or a combination thereof, associated with a positioning reference signal carrier aggregation configuration over a licensed carrier, an unlicensed carrier, or a combination thereof.

In one embodiment, the first method provides signal indications associated with a positioning measurement indicating whether a full measurement or partial measurement was performed.

A second apparatus is disclosed for positioning configuration and assistance data enhancements over unlicensed bands. The second apparatus may include a network entity as described herein, for example, the gNB, base station 121, a network function (e.g., an LMF), and/or the network equipment apparatus 800. In some embodiments, the second apparatus includes a processor executing program code, for example, a microcontroller, a microprocessor, a CPU, a GPU, an auxiliary processing unit, a FPGA, or the like.

In one embodiment, the second apparatus includes a transceiver and a processor coupled to the transceiver. In one embodiment, the processor is configured to cause the apparatus to generate and transmit, to the UE, a DL-PRS resource configuration. In one embodiment, the processor is configured to cause the apparatus to transmit, to the UE, a request to perform positioning measurements over an unlicensed band according to the DL-PRS resource configuration, the request comprising a configured CAPC for positioning, a predetermined window size of a measurement window for positioning reference signal reception, a burst configuration, and a LBT occasion within the window based on an available reception opportunity to be measured and processed over the unlicensed band, the CAPC corresponding to different positioning service levels.

A second method is disclosed for positioning configuration and assistance data enhancements over unlicensed bands. The second method may be performed by a network entity as described herein, for example, the gNB, base station 121, a network function (e.g., an LMF), and/or the network equipment apparatus 800. In some embodiments, the second method may be performed by a processor executing program code, for example, a microcontroller, a microprocessor, a CPU, a GPU, an auxiliary processing unit, a FPGA, or the like.

In one embodiment, the second method generates and transmits, to the UE, a DL-PRS resource configuration. In one embodiment, the second method transmits, to the UE, a request to perform positioning measurements over an unlicensed band according to the DL-PRS resource configuration, the request comprising a configured CAPC for positioning, a predetermined window size of a measurement window for positioning reference signal reception, a burst configuration, and a LBT occasion within the window based on an available reception opportunity to be measured and processed over the unlicensed band, the CAPC corresponding to different positioning service levels.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment (UE), comprising:
at least one memory; and
at least one processor coupled with the at least one memory
and configured to cause the UE to:
perform positioning procedures over an unlicensed band based on a configured channel access priority class (CAPC) for positioning, the CAPC corresponding to different positioning service levels;
receive a predetermined window size of a measurement window for positioning reference signal reception, a burst configuration, and a listen-before-talk (LBT) occasion within the measurement window from a location server based on an available reception opportunity to be measured and processed over the unlicensed band;
perform positioning reference signal (PRS) measurement based on the measurement window, the burst configuration, and the LBT occasion;
receive a downlink positioning reference signal (DL-PRS) burst measurement configuration for DL-PRS burst across multiple positioning frequency layers; and
receive an updated quasi-colocation assumption associated with the DL-PRS burst measurement configuration based on a directional LBT configuration.

2. The UE of claim 1, wherein the at least one processor is configured to cause the UE to perform DL-PRS burst measurements and jointly process the burst measurements over multiple licensed carriers, unlicensed carriers, or a combination thereof.

3. The UE of claim 2, wherein the updated quasi-colocation assumption comprises a quasi-colocation assumption configuration for performing positioning measurements over the unlicensed band.

4. The UE of claim 1, wherein the at least one processor is configured to cause the UE to receive the DL-PRSs, which are configured in a burst-type manner, to be measured within a channel occupancy time (COT).

5. The UE of claim 4, wherein the DL-PRS burst measurement configuration is applicable to a reference signal time difference (RSTD), UE receiving-transmitting time difference, DL reference signal received power (DL-RSRP) measurements, or a combination thereof.

6. The UE of claim 1, wherein the at least one processor is configured to cause the UE to receive the DL-PRS burst measurement configuration via a dedicated long-term evolution (LTE) positioning protocol, a positioning system information broadcast message, or a combination thereof.

7. The UE of claim 1, wherein the at least one processor is configured to cause the UE to receive the DL-PRS burst measurement configuration at one time instance or in a periodic manner.

8. The UE of claim 1, wherein the CAPC is defined for a positioning service based on positioning quality-of-service (QOS) indicators, a positioning procedure, or a combination thereof.

9. The UE of claim 8, wherein the measurement window with the predetermined window size is based on the positioning QOS indicators, a channel occupancy time (COT), or a combination thereof.

10. The UE of claim 1, wherein the at least one processor is configured to cause the UE to report a timing alignment error, a phase continuity error, or a combination thereof, associated with a positioning reference signal carrier aggregation configuration over a licensed carrier, an unlicensed carrier, or a combination thereof.

11. The UE of claim 1, wherein the at least one processor is configured to cause the UE to provide signal indications associated with a positioning measurement indicating whether a full measurement or partial measurement was performed.

12. A method of a user equipment (UE), comprising:

performing positioning procedures over an unlicensed band based on a configured channel access priority class (CAPC) for positioning, the CAPC corresponding to different positioning service levels;

receiving a predetermined window size of a measurement window for positioning reference signal reception, a burst configuration, and a listen-before-talk (LBT) occasion within the measurement window from a location server, based on an available reception opportunity to be measured and processed over the unlicensed band;

performing positioning reference signal (PRS) measurement based on the measurement window, the burst configuration, and the LBT occasion;

receiving a downlink positioning reference signal (DL-PRS) burst measurement configuration for DL-PRS bursts across multiple positioning frequency layers; and receiving an updated quasi-colocation assumption associated with the DL-PRS burst measurement configuration based on a directional LBT configuration.

13. The method of claim 12, further comprising performing DL-PRS burst measurements and jointly processing the burst measurements over multiple licensed carriers, unlicensed carriers, or a combination thereof.

14. The method of claim 13, wherein the updated quasi-colocation assumption comprises a quasi-colocation assumption configuration for performing positioning measurements over the unlicensed band.

15. The method of claim 12, further comprising receiving the DL-PRSs, which are configured in a burst-type manner, to be measured within a channel occupancy time (COT).

16. The method of claim 15, wherein the DL-PRS burst measurement configuration is applicable to a reference signal time difference (RSTD), UE receiving-transmitting time difference, DL reference signal received power (DL-RSRP) measurements, or a combination thereof.

17. The method of claim 12, further comprising receiving the DL-PRS burst measurement configuration via a dedicated long-term evolution (LTE) positioning protocol, a positioning system information broadcast message, or a combination thereof.

18. The method of claim 12, further comprising receiving the DL-PRS burst measurement configuration at one time instance or in a periodic manner.

19. A network equipment (NE), comprising:

at least one memory; and at least one processor coupled with the at least one memory and configured to cause the NE to:

generate and transmit, to a user equipment (UE), a downlink positioning reference signal (DL-PRS) resource configuration;

transmit, to the UE, a request to perform positioning measurements over an unlicensed band according to the DL-PRS resource configuration, the request comprising a configured channel access priority class (CAPC) for positioning, a predetermined window size of a measurement window for positioning reference signal reception, a burst configuration, and a listen-before-talk (LBT) occasion within the measurement window based on an available reception opportunity to be measured and processed over the unlicensed band, the CAPC corresponding to different positioning service levels;

transmit, to the UE, a DL-PRS burst measurement configuration for DL-PRS bursts across multiple positioning frequency layers; and transmit, to the UE, an updated quasi-colocation assumption associated with the DL-PRS burst measurement configuration based on a directional LBT configuration.

20. A method performed by a network equipment (NE), comprising:

generating and transmitting, to a user equipment (UE), a downlink positioning reference signal (DL-PRS) resource configuration;

transmitting, to the UE, a request to perform positioning measurements over an unlicensed band according to the DL-PRS resource configuration, the request comprising a configured channel access priority class (CAPC) for positioning, a predetermined window size of a measurement window for positioning reference signal reception, a burst configuration, and a listen-before-talk (LBT) occasion within the measurement window based on an available reception opportunity to be measured and processed over the unlicensed band, the CAPC corresponding to different positioning service levels;

transmitting, to the UE, a DL-PRS burst measurement configuration for DL-PRS bursts across multiple positioning frequency layers; and transmitting, to the UE, an updated quasi-colocation assumption associated with the DL-PRS burst measurement configuration based on a directional LBT configuration.

* * * * *